United States Patent
Sawant

(10) Patent No.: US 12,246,999 B2
(45) Date of Patent: Mar. 11, 2025

(54) OIL DISPERSION COMPOSITION

(71) Applicant: Arun Vitthal Sawant, Maharashtra (IN)

(72) Inventor: Arun Vitthal Sawant, Maharashtra (IN)

(*) Notice: Subject to any disclaimer, the term of this patent is extended or adjusted under 35 U.S.C. 154(b) by 960 days.

(21) Appl. No.: 17/294,328

(22) PCT Filed: Nov. 15, 2019

(86) PCT No.: PCT/IB2019/059817
§ 371 (c)(1),
(2) Date: May 14, 2021

(87) PCT Pub. No.: WO2020/100093
PCT Pub. Date: May 22, 2020

(65) Prior Publication Data
US 2021/0380498 A1  Dec. 9, 2021

(30) Foreign Application Priority Data
Nov. 15, 2018 (IN) .............................. 201821043061

(51) Int. Cl.
*C05F 11/00* (2006.01)
*A01N 25/04* (2006.01)
(Continued)

(52) U.S. Cl.
CPC .............. *C05F 11/00* (2013.01); *A01N 25/04* (2013.01); *C05G 3/50* (2020.02); *C05G 3/60* (2020.02); *C05G 5/27* (2020.02)

(58) Field of Classification Search
CPC ......... C05F 11/00; A01N 25/04; A01N 65/03; A01N 25/30; C05G 3/50; C05G 3/60; C05G 5/27; C05G 3/00
See application file for complete search history.

(56) References Cited

U.S. PATENT DOCUMENTS

| 4,774,186 | A | 9/1988 | Schaefer et al. |
| 6,375,968 | B1* | 4/2002 | Quong ................. B01J 13/0052 424/407 |
| 2002/0160504 | A1* | 10/2002 | Kim ........................ C05F 11/08 435/243 |

FOREIGN PATENT DOCUMENTS

| CN | 102229515 A | 11/2011 |
| CN | 102273447 A * | 12/2011 |

(Continued)

OTHER PUBLICATIONS

International Search Report issued for PCT/IB2019/059817 mailed Jun. 17, 2020.

*Primary Examiner* — Jennifer A Smith
(74) *Attorney, Agent, or Firm* — ARENTFOX SCHIFF LLP

(57) ABSTRACT

The present invention relates to a novel agricultural oil dispersion composition comprising at least one algae or their derivatives, and at least one agrochemically acceptable excipient. Particularly, the invention relates to a novel agricultural oil dispersion composition comprising at least one algae or their derivatives present in the range of 0.1%-65% by weight of the total composition, at least one water immiscible solvent present in the range of 0.1%-90% by weight of the total composition, at least one surfactant present in the range of 0.1%-80% by weight of the total composition and at least one agrochemically acceptable excipient, wherein the composition comprises particles in the size range of 0.1-50 microns. The invention relates to a process of preparing the novel agricultural oil dispersion composition. The invention further relates to a method of application of the novel oil dispersion composition to the crops, plants, locus or parts thereof or to the surrounding soil.

17 Claims, 1 Drawing Sheet

(51) Int. Cl.
*C05G 3/50* (2020.01)
*C05G 3/60* (2020.01)
*C05G 5/27* (2020.01)

(56) References Cited

FOREIGN PATENT DOCUMENTS

| | | |
|---|---|---|
| IN | 201827038295 | 10/2018 |
| IN | 201827038296 | 10/2018 |
| WO | 2010095151 A2 | 8/2010 |
| WO | 2011031287 | 3/2011 |
| WO | 2016178101 A1 | 11/2016 |
| WO | 2020100093 A3 | 5/2020 |

* cited by examiner

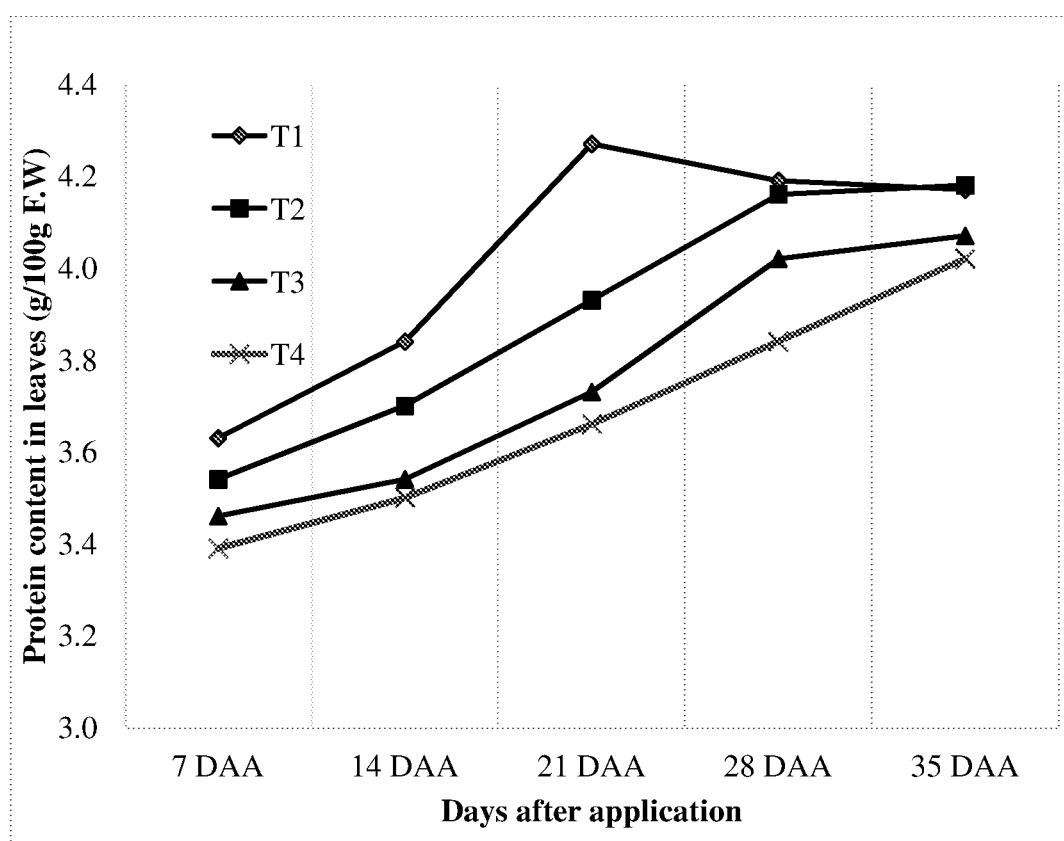

OIL DISPERSION COMPOSITION

This application is a 35 U.S.C. § 371 National Phase of PCT Application No. PCT/IB2019/059817, filed Nov. 15, 2019, which claims priority to IN 201821043061, filed Nov. 15, 2018, the disclosures of which are hereby incorporated by reference in their entireties

FIELD OF THE INVENTION

The present invention relates to a novel agricultural oil dispersion composition comprising at least one algae or their derivatives and at least one agrochemically acceptable excipient. Particularly, the invention relates to a novel agricultural oil dispersion composition comprising at least one algae or their derivatives present in the range of 0.1% to 65% by weight of the total composition; at least one water immiscible solvent present in the range of 0.1% to 90% by weight of the total composition; at least one surfactant present in the range of 0.1% to 80% by weight of the total composition, and at least one agrochemically acceptable excipient present in the range of 0.1% to 95% by weight of the total composition, wherein the composition comprises particles in the size range of 0.1 to 50 microns. The invention also relates to a process of preparing the novel agricultural oil dispersion composition comprising at least one algae or their derivatives and at least one agrochemically acceptable excipient. The invention moreover relates to a method of application of the novel composition to the plants, crops, locus or parts thereof and to a method of treating the plants, crops, locus, parts thereof or the soil with the novel oil dispersion composition.

BACKGROUND OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose.

One of the key challenges today is deteriorating soil health. Extensive use of soil fertilizers and pesticides has reduced organic and microbial matter of the soil. Plants are unable to uptake nutrients applied to the soil. Biological materials such as algae, fungi and bacteria are useful alternatives to chemical agents for improvement and/or maintenance of soil nutrients. Algae are useful alternatives to the chemical agents for improving the soil and plant health and also to control the pests. Few algal products have been known to be used as fertilizers and plant nutrient in order to decrease the burden on the environment as well as on the health of farmers and consumers. However, their use needs to be optimized and their application needs to be improved in order to provide an economical result in terms of yield, plant growth, vitality and vigor to the farmer and also reduce the burden on the environment.

Formulations with better delivery systems are key elements in the performance of different biopesticides. One of the most important way to improve efficacy of the biopesticide is through increased penetration of active ingredient into plant foliage. Oil dispersion formulation have gained interest in recent years due to their performance such as better rain fastness, improved penetration, better spreading, superior spray retention, absorption affinity, improved biological control and foliar uptake etc.

Oil dispersions (OD) are dispersions of active material in non aqueous phase intended for dilution before use. Oil dispersions are preferred over suspension concentrates as the active ingredient when formulated in an oil base provides better penetration through the leaf surface. The actives applied in the form of a oil dispersion does not get washed off with rainfall and also are retained for longer period on the leaf surface as compared to the actives applied in the form of aqueous based suspension concentrates.

However, oil dispersion composition comprising algae in the field of agrochemicals is not known. When the present inventors tried to formulate an oil dispersion composition comprising algae they met with several challenges in formulation such as stability issues, settling, sedimentation, caking, loading. The most common and difficult part in an oil dispersion formulation is the non availability of uniform suspension of the active throughout the formulation. As a result, the actives cannot be applied uniformly over the crop.

The inventors of the present invention overcame the associated problems and succeeded in formulating an oil dispersion formulation comprising at least one algae or their derivatives and at least one surfactant with particles in the size range of 0.1 to 50 microns. The formulation of the present invention not only eliminates the associated drawbacks as noted in the preceding paragraph, but also provides a superior composition which is otherwise difficult to achieve in a cost-effective manner.

The inventors of the present invention have formulated a stable oil dispersion composition wherein the algae and surfactant is present in defined concentration. Surfactants were added so as to stabilize the oil dispersion and improving the viscosity of the liquid phase in order to prevent the insoluble actives falling out of suspension and preventing sedimentation. Optionally, the use of structuring agent in the formulation aids in modifying the rheological properties of the algal composition which provides redispersion on storage and easy application to crops. Milling of the algae and excipients at shear to obtain particles in the size range of 0.1 to 50 microns also adds to physical stability preventing coalescence of the particle and ensuring uniform distribution of actives which results in enhanced efficacy of the composition when applied to crops.

Surprisingly, the inventors of the present application have determined that the oil dispersion composition including at least one algae and at least one acceptable excipient exhibits excellent biological effectiveness in terms of yield, plant growth, vitality, vigor and crop protection. Moreover, the composition of the present invention also exhibits superior physical characteristics such as suspensibility, stability, pourability, improved viscosity and is easy to apply and use. The compositions of the present invention also demonstrated superior performance under accelerated storage. Surprisingly, the oil dispersion of the present invention exhibits little or no settling during prolonged storage, it easily forms a re-suspension if agitated and exhibits little or no separation of the oily phase when diluted with water.

Thus, the inventors of the present invention have formulated a novel, stable oil dispersion composition comprising at least one algae or their derivatives in the range of 0.1% to 65% by weight of the total composition, at least one water immiscible solvent present in the range of 0.1% to 90% by weight of the total composition, at least one surfactant present in the range of 0.1% to 80% by weight of the total composition and at least one agrochemical excipient with particles in the size range of 0.1 to 50 microns which exhibits superior physical properties and better efficacy at reduced doses.

SUMMARY OF THE INVENTION

The present invention relates to a novel agricultural oil dispersion composition comprising at least one algae or their derivatives and at least one agrochemically acceptable excipient. According to further embodiment, the invention relates to a novel oil dispersion composition comprising at least one algae or their derivatives present in the concentration of 0.1% to 65% by weight of the total composition; at least one water immiscible solvent present in the range of 0.1% to 90% by weight of the total composition; at least one surfactant present in the range of 0.1% to 80% by weight of the total composition and at least one agrochemically acceptable excipient present in the range of 0.1% to 95% by weight of the total composition, wherein the composition comprises particles in the size range of 0.1 to 50 microns. According to an embodiment, the algal composition includes one or more of green algae, red algae, golden algae, brown algae, golden-brown algae, blue algae, blue-green algae or their species or their derivatives and mixtures thereof.

According to an embodiment, the invention further relates to a process of preparation of the oil dispersion composition comprising at least one algae and at least one agricultural excipient.

According to an embodiment, the invention further relate to the use of the algal composition in the form of an oil dispersion as at least one of a nutrient composition, a plant strengthener composition, a soil conditioner composition, plant fortification, plant protection and a yield enhancer composition.

According to an embodiment, the invention further relates to a method of improving the plant health, improving the plant nutrition, fortifying the plant, protecting the plant, enhancing the plant yield, protecting the crops, or conditioning the soil; the method comprising treating at least one of the seeds, seedling, crops, a plant, plant propagation material, locus or parts thereof or the surrounding soil with an effective amount of the algal composition in the form of an oil dispersion comprising at least one algae or their derivatives and at least one agrochemically acceptable excipient.

It was also observed that the composition exhibited good physical and chemical properties, enhanced stability even at extended storage under higher temperatures.

BRIEF DESCRIPTION OF THE DRAWINGS

For a more complete understanding of the invention, reference should now be made to the embodiments illustrated in greater detail in the accompanying drawings and described by way of embodiments of the invention.

FIG. 1: Graphical representation to study the effect of oil dispersion composition of *Spirulina* at different particle size on protein uptake by plant leaves.

DETAILED DESCRIPTION OF THE INVENTION

In describing the embodiments of the invention, specific terminology is resorted for the sake of clarity. However, it is not intended that the invention be limited to the specific terms so selected and it is to be understood that each specific term includes all technical equivalents that operate in a similar manner to accomplish a similar purpose.

According to the invention, the term "oil dispersion" can be defined as a stable suspension of active ingredients in a water immiscible fluid usually intended for dilution with water before use. The oil dispersions also further include other dissolved ingredients in the formulation. The term oil suspension or oil suspension concentrates and oil dispersion can be used interchangeably.

The invention relate to a novel agricultural oil dispersion composition comprising at least one algae or their derivatives, and at least one agrochemically acceptable excipient. More particularly, the invention relate to a novel agricultural oil dispersion composition comprising at least one algae or their derivatives present in the range of 0.1% to 65% by weight of the total composition; at least one water immiscible solvent present in the range of 0.1% to 90% by weight of the total composition; at least one surfactant present in the range of 0.1% to 80% by weight of the total composition; and at least one agrochemically acceptable excipient present in the range of 0.1% to 95% by weight of the total composition.

The inventors have further determined that the composition of the present invention surprisingly has good pourability, suspensibilty, dispersion stability, better penetration, ease of handling and also reduces the loss of material while handling the product at the time of packaging as well as during field application. Surprisingly, the inventors have also determined that the oil dispersion composition display superior efficacy at reduced dosages.

According to an embodiment, the algae is microalgae, salt water algae or fresh water algae or species, their derivatives or mixtures thereof.

According to further embodiment, the algae is at least one belonging to the group selected from green algae, red algae, golden algae, brown algae, golden-brown algae, blue algae or blue-green algae or their derivatives, species or mixtures thereof.

According to still further embodiment, the algae is at least one selected from the division, but not limited to Cyanobacteria, Ochrophytes, Glaucophytes, Rhodoplasts, Rhodophytes, Chloroplasts, Chrysophyta, Synurophytes, Silicoflagellata, Heterokonts, Crytophytes, Haptophytes, Euglenophytes, Chlorophytes, Charophytes, Land Plants, Embrophyta Or *Chlorarachniophytes* or their derivatives, species or mixtures thereof. However, those skilled in the art will appreciate that it is possible to utilize any other algae known in the art from other division, without departing from the scope of the invention.

According to further embodiment, the algae is least one selected from the family, but not limited to Bryopsidaceae, Acrotylaceae, Areschougiaceae, Cystocloniaceae, Dicranemataceae, Hypneaceae, Dumontiaceae, Caulerpaceae, Codiaceae, Halimedaceae, Udoteaceae, Anadyomenaceae, Polyphysaceae, Siphonocladaceae, Valoniaceae, Ulvaceae, Chordariaceae, Punctariaceae, Dictyotaceae, Ectocarpaceae, Rhodymeniaceae, Gelidiaceae, Cystoseiraceae, Sargassaceae, Sporochnaceae, Sphacelariaceae, Scytosiphonaceae, Alariaceae, Gracilariaceae, Rhizophyllidaceae, Porphyridiaceae, Acrochaetiaceae, Bonnemaisoniaceae, Ceramiaceae, Dasyaceae, Rhodomelaceae, Delesseriaceae, Phacelocarpaceae, halymeniaceae, Liagoraceae, Chrysomonadales, Chrysocapsales, Chrysosphaerales, Chrysotrichales, Heterokontae, Diatomeae, Galaxauraceae, Plocamiaceae, Champiaceae, Sebdeniaceae, Lomentariaceae, Peyssonneliaceae, Nizymeniaceae, Kallymeniaceae, Corallinaceae, Nemastomataceae, Prymnesiophycees, Choristocarpaceae, Discosporangiaceae, Petrodermataceae, Syringodermataceae, Onslowiaceae, Dictyotaceae, Lithodermataceae, *Eustigmatophyte*, Phaeostrophionaceae, Sphacelodermaceae, Stypocaulaceae, Cladostephaceae, Sphacelariaceae, Asterocladaceae, Les soniaceae, Ascoseiraceae, Cutleriaceae, Arthrocladiaceae, Desmarestiaceae, Acinetosporaceae, Adenocystaceae, Prasinophyceae, Chordariaceae, Chordariopsidaceae, Mesosporaceae, Myrionemataceae, Pylaiellaceae, Bifurcariopsidaceae, Durvillaeaceae, Fucaceae, Himanthaliaceae, Hormosiraceae, Notheiaceae, Sargassaceae, Seirococcaceae, Akkesiphycaceae, Alariaceae, Chordaceae, Costariaceae, Pseudochordaceae, Nemodermataceae, Neoralfsiaceae, Ralfsiaceae, Chnoosporaceae, Splachnidiaceae, Sporochnaceae, Halosiphonaceae, Masonophycaceae, Phyllariaceae, Stschapoviaceae, Tilopteridaceae, Heterochordariaceae, B acillariophyceae, Aminariaceae, Phaeophyceae, Raphidiophyceae, Eumastigophyceae, Xanthophyceae, Ishigeaceae, Florideophyceae, Scytothamnaceae or their derivatives, species and mixtures thereof. However, those skilled in the art will appreciate that it is possible to utilize any other algae known in the art from other family, without departing from the scope of the invention.

According to still further embodiment, the algae is at least one belonging to the genus selected from, but not limited to *Spirulina* Sp., *Nitzschia* Sp., *Navicula* Sp., *Ahnfeltia* Sp., *Anikstrodesmis* Sp., *Arthrospira* Sp., *Anabaena* Sp., *Psedoanabeana* Sp., *Nannochloris* Sp. *Asteromenia* Sp., *Botryocladia* Sp., *Chlorella* Sp., *Haematococcus* Sp., *Dunaliella* Sp., *Selenasirum* Sp., *Nannochhropsis* Sp., *Scenedesm* Sp., *Graciaria* Sp., *Oscillatoria* Sp., *Phormidium* Sp., *Nemastoma* Sp., *Amphora* Sp., *Oehromonas* Sp. *Cyanidioschyzon* Sp., *Caulerpa* Sp., *Dictyosphaeria* Sp., *Haliptilon* Sp., *Atractophora* Sp., *Valonia* Sp., *Boodlea* Sp., *Gymnopilus* sp., *Melanothamnus* sp., *Turbeneria* sp., *Mastigocladopsis* sp., *Gelidiella* Sp., *Ceratodictyon* Sp., *Pneophyllum* Sp., *Kallymenia* Sp., *Predaea* Sp, *Siphonocladus* Sp., *Cladophoropsis* Sp., *Amphiplexia* Sp., *Lemanea* Sp., *Mesophyllum* Sp., *Palmaria* Sp., *Cladosiphon* Sp., *Schmitzia* Sp., *Colpomenia* Sp., *Cryptophycees* Sp., *Metagoniolithon* Sp., *Hydrolithon* Sp., *Hypoglossum* Sp., *Seirospora* Sp., *Jania* Sp., *Metamastophora* Sp., *Amphiroa* Sp., *Acanthophora* Sp., *Chondrus* Sp., *Cottoniella* Sp., *Pleonosporium* Sp., *Ditria* Sp., *Endosiphonia* Sp., *Doxodasya* Sp., *Drewiana* Sp., *Dictyomenia* Sp., *Antithamnion* Sp., *Platysiphonia* Sp., *Heterodoxia* Sp., *Dasyclonium* Sp., *Chondria* Sp., *Haraldiophyllum* Sp., *Aglaothamnion* Sp., *Struvea* Sp., *Sarcomenia* Sp., *Acrothamnion* Sp., *Martensia* Sp., *Lejolisia* Sp., *Haloplegma* Sp., *griffithsia* Sp., *Glaphrymenia* Sp, *Dasya* Sp., *Acrosorium* Sp., *Spyridia* Sp., *Hemineura* Sp., *Wrangelia* Sp., *Trithamnion* Sp., *Dasyphila* Sp., *Claudea* Sp., *Corallophila* Sp., *Perischelia* Sp., *Monosporus* Sp., *Carpothamnion* Sp., *Guiryella* Sp., *Gattya* Sp., *Mastocarpus* Sp., *Anotrichium* Sp., *Centroceras* Sp., *Ceramium* Sp., *Caulerpa* Sp., *Vanvoorstia* Sp., *Euptilocladia* Sp., *Titanophora* Sp., *Tanakaella* Sp., *Asparagopsis* Sp., *Lithophyllum* Sp., *Acrochaetium* Sp., *Euptilota* Sp., *Audouinella* Sp., *Botryococcus* Sp., *Actmanthes* Sp., *Ahnfeltiopsis* Sp., *Agmenemum* Sp., *Cochlodinium* Sp., *Amphiprora* Sp., *Anfiistrodesmus* Sp., *Ammsirodesnms* Sp., *Borodinetta* Sp., *Carteria* Sp., *Stylonema* Sp., *Chaetoceros* Sp., *Chlamydomas* Sp., *Chlorococcuni* Sp., *Chlorogoni* Sp., *Chroomonas* Sp., *Chrysosphaera* Sp., *Ciicosphaera* Sp., *Crypthecodinium* Sp., *Cryptomonas* Sp., *Cyclotella* Sp., *Dimaliella* Sp., *Eremosphaera* Sp., *Ellipsoidon* Sp., *Euglena* Sp., *Franceia* Sp., *Gloeocapsa* Sp., *Fragilaria* Sp., *Gleocapsa* Sp., *Gloeothamnion* Sp., *Cyanospira* Sp., *Hymenomonas* Sp., *Bockrysis* Sp., *Hochrysis* Sp., *Lepocinclis* Sp., *Stauroneis* Sp., *Micraclinium* Sp., *Chrysymenia* Sp., *Micractinhnn* Sp., *Monaraphidium* Sp., *Nannochloris* Sp., *Navicida* Sp., *Porphyridium* Sp., *Nizymania* Sp., *Scenedesmus* Sp., *Synechoccus* Sp. *Navicul* Sp., *Nephrochloris* Sp., *Odontella* Sp., *Muriellopsis* Sp., *Tschia* Sp., *Nitzschia* Sp., *Isochrysis* Sp., *Phaedactylum* Sp., *Lyngbya* Sp., *Aphanizomenonflos* Sp., *Ochromonas* Sp., *Oocyst* Sp., *Pamchlorelta* Sp., *Peyssonnelia* Sp., *Pascheria* Sp., *Pavlova* Sp., *Phaeodactyhan* Sp., *Cylindrospermum* Sp., *Tolypothrix* Sp., *Hapalosiphon* Sp., *Cylindrotheca* Sp., *Anacystis* Sp., *Ertilissima* Sp., *Aulosira* Sp., *Phortmdium* Sp., *Platytnonas* Sp., *Pleurochrysis* Sp., *Leptolyngbya* Sp., *Neochloris* Sp., *Prototheca* Sp., *Pseudochlorella* Sp., *Hormotilopsis* Sp., *Gyrodinium* Sp., *Ellipsoidion* Sp., *Pyramimonas* Sp., *Pyrobotrys* Sp., *Sarcinoid* Sp., *Schizochytrmm* Sp., *Spirogyra* Sp., *Stichococcus* Sp., *Synechococcas* Sp., *Synechocystisf* Sp., *Tagetes* Sp., *Tetraedron* Sp., *Tetraselmis* Sp., *Thalassiosira* Sp., *Viridiella* Sp., *Alaria* Sp., *Saccharina* Sp., *Coelarthrum* Sp., *Nereocystis* Sp., *Laminaria* Sp., *Porphyra* Sp., *Phaeocystis* Sp., *Aphanocapsa* Sp., *Phacelocarpus* Sp., *Ulva* Sp., *Himanthalia* Sp., *Cyanothece* Sp., *Ascophyllum* Sp., *Focus* Sp., *Kappaphycus* Sp., *Betaphycus* Sp., *Gelidium* Sp., *Planktothricoides* Sp., *Prochlorococcus* Sp., *Prochloron* Sp., *Prochlorothrix* Sp., *Blastophysa* Sp., *Pedinomonas* Sp., *Resultor* Sp., *Marsupiomonas* Sp., *Chlorokybus* Sp., *Coleochaete* Sp., *Awadhiella* Sp., *Prymnesiophycées* Sp., *Radioramus* Sp., *Conochaete* Sp., *Lithothamnion* Sp., *Phymatolithion* Sp., *Portieria* Sp., *Eustigmatophyte* Sp., *Amphidinum* Sp., *Micractinium* Sp., *Sargassum* Sp., *Curdiea* Sp., *Coelothrix* Sp., *Fucus* Sp., *Eklonia* Sp., *Chlamydomonas* Sp., *Cladophora* Sp., *Gelidiopsis* Sp., *Agmenellum* Sp., *Desmodesmus* Sp., *Halydris* Sp., *Chlorococcum* Sp., *Glossomastix* Sp., *Iridaea* Sp., *Acrosiphonia* Sp., *Goniochloris* Sp., *Gloeothece* Sp., *Emiliana* Sp., *Codium* Sp., *Monochrysis* Sp., *Palma* Sp., *Acetabularia* Sp., *Phaffia* Sp., *Platymonia* Sp., *Mphora* Sp., *Rhodymenia* Sp., *Analipus* Sp., *Egregia* Sp., *Chaetomorph* Sp., *Gymnogongrus* Sp., *Asperococcus* Sp., *Bryopsis* Sp., *Rhizoclonium* Sp., *Gloiocladia* Sp., *Ecklonia* Sp, *Girgatina* Sp., *Hymenocladia* Sp., *Lomentaria* Sp., *Schizochytrium* Sp., *Aphanotece* Sp., *Plocamium* Sp., *Constantinea* Sp., *Cryptosiphonia* Sp., *Webervanboas sea* Sp., *Les soniopsis* Sp., *Chondracanthus* Sp., *Dictyopteris* Sp., *Farlowia* Sp., *Anadyomene* Sp., *Apelvetia* Sp., *Endocladia* Sp., *Coralline* Sp., *Thraustochytrium* Sp., *Osmundea* Sp., *Callophyllis* Sp. *M Calliarthron* Sp., *Monoraphidium* Sp., *Penicillus* Sp., *Meristotheca* Sp., *Wrack* Sp., *Cosmocladium* Sp., *Calothrix* Sp., *Polysiphonia* Sp., *Prionitis* Sp., *Leathesia* Sp., *Polyneura* Sp., *Pelvetiopsis* Sp., *Chlamidonomas* Sp., *Neorhodomela* Sp., *Microdictyon* Sp., *Melobesia* Sp., *Dinoflagellate* Sp., *Delesseria* Sp., *Postelsia* Sp., *Microcladia* Sp., *Dilsea* Sp., *Halimeda* Sp., *Chroococus* Sp., *Phaeodactylum* Sp., *Semnocarpoa* Sp., *Champia* Sp., *Erythrophyllum* Sp., *Chodium* Sp., *Paonia* Sp., *Ulothrix* Sp., *Gracilaria* Sp., *Rivularia* Sp., *Phromidium* Sp., *Stypopodium* Sp., *Erythrocladia* Sp., *Bracchiomonas* Sp., *Coradophylum* Sp., *Cyanophyta* Sp., *Dysmorphococcus* Sp., *Cystoseira* Sp., *Dilophus* Sp., *Gloiotrichus* Sp., *Liagora* Sp., *Eisenia* Sp., *Ganonema* Sp., *Hennedya* Sp., *Codiophyllum* Sp., *Ecklonia* Sp., *Distromium* Sp., *Sparlingia* Sp., *Gastrocelonium* Sp., *Claviclonium* Sp., *Pelvetia* Sp., *Mazzaella* Sp., *Lobophora* Sp., *Pterocladia* Sp., *Scinaia* Sp., *Galaxaura* Sp., *Gloiopeltis* Sp., *Scillatoria* Sp., *Hypnea* Sp., *Hormophysa* Sp., *Dotyophycus* Sp., *Opuntiella* Sp., *Nannochloropsis.* Sp., *Myriodesma* Sp., *Tricleocarpa* Sp., *Trichogloea* Sp., *Yamadaella* Sp., *Sebdenia* Sp., *Gelinaria* Sp., *Prymnesium* Sp., *Herposiphonia* Sp., *Jeannerettia* Sp., *Kuetzingia* Sp., *Laurencia* Sp., *Lenormandiopsis* Sp., *halymenia* Sp., *Eucheuma* Sp., *Erythroclonium* Sp., *Achnanthes* Sp., *Rhodopeltis* Sp., *Dudresnaya* Sp., *Halosaccion* Sp., *Zonaria* Sp., *Areschougia* Sp., *Hincksia* Sp., *Osmundaria* Sp., *Placophora* Sp.,

*Lophocladia* Sp., *Macrocystis* Sp., *Callophycus* Sp., *Microcoleus* Sp., *Epiphloea* Sp., *Acrosymphyton* Sp., *Cryptonemia* Sp., *Enteromorpha* Sp., *Neurymenia* Sp., *Lophosiphonia* Sp., *Microcystis* Sp., *Protokuetzingia* Sp., *Leveillea* Sp., *Caulocystis* So., *Hydroclathrus* Sp., *Scaberia* Sp., *Rosenvingea* Sp., *Schizothrix* Sp., *Rhodella* Sp., *Spirocladia* Sp., *Acrochaetium Robustum Børgesen*, *Tolypiocladia* Sp., *Tylotus* Sp., *Dicranema* Sp., *Pachydictyon* Sp., *Austronereia* Sp., *Sporochnus* Sp., *Craspedocarpus* Sp., *Solieria* Sp., *Encyothalia* Sp., *Nanococcus* Sp., *Gracilaria* Sp., *Grateloupia* Sp., *Hildenbrandiasp.*, *Amphiroa* Sp., *Cheilosporum* Sp., *Corallina* Sp., *Hydrolithonsp.*, *Hydrolithonsp.*, *Jania* Sp., *Lithophyllumsp.*, *Catenella* Sp., *Chondracanthus* Sp., *Hypnea flagelliformissp.*, *Ahnfeltiopsis* Sp., *Champia* Sp., *Gastroclonium* Sp., *Gelidiopsis* Sp., *Gayliellaflaccida* sp., *Aglaothamnion* Sp., *Crouania* Sp., *Ptilothamnion* Sp., *Dasya* Sp., *Caloglossa* Sp., *Aloglossa* Sp., *Erythroglossum* Sp., *Martensia fragilissp.*, *Bostrychia* Sp., *Chondria* Sp., *Herposiphonia* Sp., *Laurencia obtusesp.*, *Neosiphonia* Sp., *Polysiphonia* Sp., *Vaucheria* Sp., *Feldmannia* sp., *Hinksia* Sp., *Ralfsiasp.*, *Sphacelaria* Sp., *Canistrocarpus* Sp., *Dictyota* Sp., *Padina* Sp., *Pyropia* Sp., *Spatoglossum* Sp., *Spatoglossum* Sp., *Stoechospermum* Sp., *Chnoospora* Sp., *Iyengaria* Sp., *Gayralia* Sp., *Chaetomorpha* Sp., *Cladophora* Sp., *Cladophoropsis* Sp., *Phyllodictyon* Sp., *Valoniopsis* Sp., *Bryopis* Sp., *Caulerpa* Sp., *Avrainvillea* Sp., *Chlorodesmis* Sp., *Petrocelis* Sp., *Ectocarpus* Sp., *Bossiella* Sp., *Candida* Sp., or derivatives and mixtures thereof. However, those skilled in the art will appreciate that it is possible to utilize any other genus of algae known in the art, without departing from the scope of the invention. The algae are commercially manufactured and available through various vendors in India and abroad. However, the algae employed in the present invention have been procured from foreign vendors.

According to another embodiment, the algae is at least one species selected from, but not limited to: *Anabena cylindrica*, *Bryopsis australs*, *Bryopsis minor*, *Botryococcus Braunii*, *Actmanthes orientalis*, *Amphiprora hyaline*, *Amphora coffeiformis*, *Amphora cqffeifoiinis* Var. *Linea*, *Chlorideila simplex*, *Apelvetia canaliculata*, *Caulerpa taxifolia*, *Amphora cqffeiformis* Var. *Punctata*, *Amphora cqffeiformis* Var. *Taylori*, *Laurencia spectabilis*, *Gymnogongrus crenulatus*, *Opuntiella californica*, *Gymnogongrus griffithsiae*, *Achnanthes orientalis*, *Cladosiphon filum*, *Goniochloris sculpta*, *Ecklonia cava*, *Osmundea spectabilis*, *Neorhodomela larix*, *Asperococcus bullosus*, *Caulerpa cactoides*, *Gelidium micropterum*, *Caulerpa cliftonii*, *Caulerpa cupressoides*, *Caulerpa fergusonii*, *Caulerpa lentillifera*, *Caulerpa mexicana*, *Ahnfeltia plicata*, *Caulerpa obscura*, *Caulerpa racemosa*, *Caulerpa racemosa* Var. *corynephora*, *Caulerpa racemosa* Var. *Laetivirens*, *Caulerpa racemosa* Var. *Lamourouxii*, *Caulerpa racemosa* Var. *peltata*, *Caulerpa serrulata*, *Caulerpa simpliciuscula*, *Asteromenia peltata*, *Botryocladia skottsbergii*, *Botryocladia cabillaceae*, *Ceratodictyon spongiosum*, *Chrysymenia kaernbachii*, *Chrysymenia ornata*, *Coelarthrum cliftonii*, *Coelothrix irregularis*, *Chara globularis*, *Gelidiopsis variabilis*, *Gymnopilus edulis*, *Tetraselmis maculate*, *Prymnesium parvum*, *Chlamydomonas rheinhardii*, *Euglena gracilis*, *Caulerpa scalpelliformis*, *Padina pavonica*, *Sargassum tenerrimum*, *Sargassum wightii*, *Chondria armata*, *Caulerpa racemosa*, *Lyngby majuscule*, *Prasiola crispa*, *Gloiocladia halymenioides*, *Pterocladia capillacea*, *Prymnesium parvum*, *Gloiocladia indica*, *Gloiocladia rubrispora*, *Gloiosaccion brownii*, *Gelidium pusillum*, *Hymenocladia usnea*, *Phymatolithion calcereum*, *Lithothamnion calcareoum*, *Herposiphonia secunda*, *Herposiphonia secunda F. tenella*, *Heterostroma nereidiis*, *Jeannerettia lobata*, *Jeannerettia pedicellata*, *Kuetzingia canaliculata*, *Laurencia brongniartia*, *Laurencia cruciata*, *Laurencia filiformis*, *Laurencia majuscula*, *Laurencia papillosa*, *Lenormandiopsis latifolia*, *Leveillea jungermannioides*, *Lophocladia harveyi*, *Lophosiphonia prostrata*, *Neurymenia fraxinifolia*, *Osmundaria spiralis*, *Placophora binderi*, *Polysiphonia decipiens*, *Polysiphonia gracilis*, *Protokuetzingia australasica*, *Spirocladia barodensis*, *Tolypiocladia glomerulata*, *Amphiroa anceps*, *Amphiroa foliacea*, *Amphiroa gracilis*, *Haliptilon roseum*, *Hydrolithon farinosum*, *Hydrolithon onkodes*, *Jania pulchella*, *Lithophyllum bermudense*, *Mesophyllum engelhartii*, *Mesophyllum erubescens*, *Mesophyllum funafutiense*, *Metagoniolithon radiatum*, *Metagoniolithon stelliferum*, *Metamastophora flabellata*, *Pneophyllum fragile*, *Gelidium austral*, *Pterocladia lucida*, *Gelidiella pannosa*, *Amphiplexia hymenocladioides*, *Claviclonium ovatum*, *Hennedya crispa*, *Areschougia ligulata*, *Callophycus serratus*, *Callophycus oppositifolius*, *Erythroclonium sonderi*, *Eucheuma denticulatum*, *Eucheuma gelatinum*, *Eucheuma speciosum*, *Meristotheca papulosa*, *Solieria robusta*, *Craspedocarpus venosus*, *Dicranema revolutum*, *Tylotus obtusatus*, *Acrosymphyton taylorii*, *Dudresnaya capricornica*, *Rhodopeltis borealis*, *Hypnea spinella*, *Hypnea valentiae*, *Stylonema alsidii*, *Audouinella saviana*, *Asparagopsis armata*, *Asparagopsis taxiformis*, *Acrothamnion preissii*, *Aglaothamnion cordatum*, *Anotrichium tenue*, *Antithamnion antillanum*, *Antithamnion armatum*, *Antithamnion hanovioides*, *Carpothamnion gunnianum*, *Centroceras clavulatum*, *Ceramium filicula*, *Ceramium flaccidum*, *Ceramium isogonum*, *Ceramium macilentum*, *Ceramium mazatlanense*, *Ceramium puberulum*, *Ceramium sherpherdii*, *Ceramium sympodiale*, *Corallophila huysmansii*, *Dasyphila preissii*, *Drewiana nitella*, *Euptilocladia spongiosa*, *Euptilota articulata*, *Gattya pinnella*, *Griffithsia ovalis*, *Guiryella repens*, *Haloplegma preissii*, *Lejolisia aegagropila*, *Monosporus indicus*, *Perischelia glomulifera*, *Pleonosporium caribaeum*, *Seirospora orientalis*, *Spyridia filamentosa*, *Tanakaella itonoi*, *Trithamnion gracilissimum*, *Wrangelia plumosa*, *Dasya iyengarii*, *Dasya pilosa*, *Acrosorium decumbens*, *Claudea elegans*, *Cottoniella filamentosa*, *Haraldiophyllum erosum*, *Hemineura frondosa*, *Heterodoxia denticulata*, *Hypoglossum caloglossoides*, *Hypoglossum revolutum*, *Martensia australis*, *Martensia fragilis*, *Platysiphonia corymbosa*, *Platysiphonia delicata*, *Platysiphonia marginalis*, *Sarcomenia delesserioides*, *Acanthophora dendroides*, *Acanthophora spicifera*, *Chondria curdieana*, *Chondria dangeardii*, *Chondria lanceolata*, *Dasyclonium flaccidum*, *Dasyclonium incisum*, *Dictyomenia sonderi*, *Dictyomenia tridens*, *Ditria expleta*, *Doxodasya bolbochaete*, *Endosiphonia spinuligera*, *Rhodymenia leptophylla*, *Rhodymenia sonderi*, *Webervanboassea splachnoides*, *Glaphrymenia pustulosa*, *Kallymenia cribrogloea*, *Kallymenia cribrosa*, *Nemastoma damaecornis*, *Predaea laciniosa*, *Predaea weldii*, *Titanophora weberae*, *Nizymania conferta*, *Peyssonnelia capensis*, *Peyssonnelia inamoena*, *Phacelocarpus alatus*, *Portieria hornemannii*, *Curdiea obesa*, *Gracilaria canaliculata*, *Gracilaria preissiana*, *Gracilaria textorii*, *Codiophyllum flabelliforme*, *Erythrocladia irregularis*, *Cryptonemia kallymenioides*, *Epiphloea bullosa*, *Gelinaria ulvoidea*, *Halymenia floresia*, *Sebdenia flabellata*, *Porphyra crispate kjellman*, *Gracilaria corticata*, *Gracilaria foliifera*, *Gracilaria verrucosa*, *Grateloupia filicina*, *Grateloupia filicina F. horrida*, *Grateloupia lithophila*, *Peyssonnelia obscura*, *Hildenbrandia rubra*, *Amphiroa anceps*, *Amphiroa fragilissima*, *Amphiroa rigida*, *Cheilosporum spectabile*, *Corallina Officinalis*, Hydrolithon farinosum, Hydrolithon reinboldii, Jania rubens, Lithophyllum orbiculatum, Catenella caespitose, Chondracanthus acicularis, Hypnea flagelliformis, Hypnea musciformis, Hypnea spinella, Hypnea valentiae, Ahnfeltiopsis pygmaea, Champia compressa, Champia parvula, Gastroclonium compressum, Gelidiopsis variabilis, Antithamnion cruciatum, Ceramium cimbricum, Ceramium cruciatum, Aglaothamnion tenuissimum, Crouania attenuata, Ptilothamnion speluncarum, Wrangelia argus, Dasya ocellata, Caloglos sa leprieurii, Aloglossa ogasawaraensis, Erythroglos sum lusitanicum, Hypoglossum hypoglossoides, Acanthophora muscoides, Bostrychia radicans, Bostrychia tenella, Chondria armata, Chondria capillaries, Herposiphonia secunda, Laurencia obtuse, Neosiphonia ferulacea, Polysiphonia atlantica, Polysiphonia denudate, Vaucheria longicaulis, Feldmannia indica, Feldmannia irregularis, Hinksia mitchelliae, Ralfsia verrucosa, Sphacelaria rigidula, Canistrocarpus cervicornis, Canistrocarpus crispatus, Canistrocarpus magneanus, Dictyopteris australis, Dictyota bartayresiana, Dictyota ceylanica, Dictyota ciliolate, Dictyota dichotoma, Dictyota divaricata, Dictyota dumosa, Padina antillarum, Padina australis, Padina boryana, Padina gymnospora, Padina pavonica, Spatoglossum asperum, Spatoglossum variabile, Stoechospermum polypodioides, Chnoospora minima, Colpomenia sinuosa, Iyengaria stellata, Rosenvingea orientalis, Sargassum cinctum, Sargassum cinereum, Sargassum crassifolium, Sargassum glaucescens, Sargassum ilicifolium, Sargassum plagiophyllum, Sargassum polycystum, Sargassum prismaticum, Sargassum swartzii, Sargassum tenerrimum, Sargassum vulgare, Gayralia oxysperma, Ulva clathrata, Ulva compressa, Ulva conglobata, Ulva flexuosa, Ulva intestinalis, Ulva rigida, Ulva taeniata, Chaetomorpha antennina, Chaetomorpha linum, Chaetomorpha spiralis, Cladophora bombayensis, Cladophora coelothrix, Cladophora glomerata, Cladophora lehmanniana, Cladophora prehendens, Cladophora prolifera, Cladophora rhizoclonioidea, Cladophora saracenica, Cladophora socialis, Cladophora vagabunda, Rhizoclonium tortuosum, Boodlea composite, Cladophoroposis sundanensis, Phyllodictyon anastomosans, Valoniopsis pachynema, Bryopis hypnoides, Bryopsis pennata, Bryopsis plumose, Caulerpa peltata, Caulerpa racemosa, Caulerpa scalpelliformis, Caulerpa sertularioides, Caulerpa verticillata, Avrainvillea erecta, Chlorodesmis hildebrandtii, Dotyophycus abbottiae, Ganonema farinosa, Gloiotrichus fractalis, Liagora setchellii, Trichogloea requienii, Galaxaura marginata, Galaxaura obtusata, Galaxaura rugosa, Scinaia tsinglanensis, Tricleocarpa cylindrica, Plocamium preissianum, Champia compressa, Champia pravula, Champia zostericola, Lomentaria corallicola, Lomentaria monochlamydea, Semnocarpoa minuta, Caulerpa webbiana, Caulerpa racemosa Var. turbinata, Neorhodomela oregona, Odonthalia floccose, Odonthalia floccosa, Forma comosa, Odonthalia washingtoniensis, Ecklonia kurome, Mastocarpus jardinii, Acetabularia calyculus, Halimeda cuneata, Porphyra suborbiculata, Porphyra vietnamensis, Cladophoropsis herpestica, Siphonocladus tropicus, Struvea plumosa, Rhodella maculate, Polysiphonia hendryi, Ecklonia stoloifera, Microcladia borealis, Microdictyon umbilicatum, Ecklonia maxima, Ecklonia radiate, Nereocystis luetkeana, Penicillus nodulosus, Ecklonia bicyclis, Ecklonia arborea, Eisenia bicyclis, Eisenia arboraea, Halosaccion glandiforme, Amphora coffeiformis Var. tenuis, Dictyosphaeria cavernosa, Dictyopteris muelleri, Dictyopteris plagiogramma, Dictyota ciliolata, Dictyota dichotoma, Dictyota dichotoma Var intricata, Dictyota furcellata, Dictyota mertensii, Dictyota naevosa, Dilophus crinitus, Dilophus fastigiatus, Dilophus robustus, Distromium flabellatum, Lobophora variegata, Pachydictyon paniculatum, Sargassum boryi, Sargassum decurrens, Sargassum distichum, Sargassum fallax, Sargassum ligulatum, Sargassum linearifolium, Sargassum podacanthum, Sargassum spinuligerum, Sargassum tristichum, Padina boergesenii, Padina elegans, Padina sanctae-crucis, Padina tenuis, Stypopodium australasicum, Stypopodium flabelliforme, Zonaria turneriana, Hincksia mitchelliae, Caulocystis uvifera, Cystoseira trinodis, Hormophysa cuneiformis, Myriodesma quercifolium, Scaberia agardhii, Ecklonia radiata, Hydroclathrus clathratus, Sphacelaria biradiata, Sphacelaria novae-hollandiae, Sphacelaria rigidula, Austronereia australis, Encyothalia cliftonii, Sporochnus comosus, Dictyosphaeria versluysii, Amphora delicatissima, Amphora delicatissima Var. capitata, Cosmocladium perissum, Anadyomene brownie, Ammsirodesnms falcatus, Dilsea californica, Gigartina agardhii, Delesseria decipiens, Polyneura latissima, Mastocarpus papillatus, Cryptosiphonia woodii, Porphyra pseudolanceolata, Melobesia mediocris, Boekelovia hooglandii, Codium duthieae, Codium geppiorum, Codium laminarioides, Codium lucasii, Codium spongiosum, Plocamium cartilagineum, Farlowia mollis, Hypnea musciformis, Meristotheca senegalensis, Sparlingia pertussa, Meristotheca papulosa, Halydris siliquosa, Rhodymenia pertussa, Botryococcus brmmii, Botryococcus sudeticus, Erythrophyllum delesserioides, Gigartina papillata, Bracteococcus minor, Egregia menziesii, Laminaria sinclairii, Bracteococcus medionucleats, Lessoniopsis littoralis, Chaetoceros gracilis, Valonia macrophysa, Gloiopeltis furcata, Constantinea simplex, Colpomenia bullosa, Ahnfeltiopsis linearis, Colpomenia peregrine, Endocladia muricata, Callithamnion pikeanum, Choetoceros muejleri, Calliarthron tuberculosum, Choetoceros mueeri Var. subsalsum, Chlamydomas perigratmlata, Chlorella anitrata, Chlorella antarctica, Chloreuaureo viridis, Chlamydomas rheinhardii, Neochloris oleoabundans, Emiliana huxleyi, Chlamydomas sajao, Gigartina exasperate, Chondracanthus exasperates, Chlamydomas moewusii, Nanococcus vulgaris, Pelvetiopsis limitata, Chlorella ellipsoidea, Postelsia palmaeformis, Chlorelia etmrsonii, Sargassum muticum, Chlorell fusco, Eklonia maxima, Chlorella fusca Var. vacuolate, Ceramium rubrum, Chlorella glucolropha, Leathesia marina, Chlorella infiisionum, Analipus japonicas, Chlorella infimon M Var. actophija, Desmodesmus asymmetricus, Chlorella infustomtm Var. attxenophila, Chlorella kessleri, Chlorella lobaphord, Chlorella luieoviridis, Chlorella luieoviridis Var. aureovmdts, Ralfsia fungiformis, Ceramium codicola, Chlorella hiteavmdis Var, hitescens, Chlorella riniata, Chlorella minttssima, Chlorella mutabilis, Chlorella nocturna, Chlorella ovalis, Costaria costata, Desmarestia ligulata, Fucus vesiculosus, Fucus serratus, Fucus gardneri, Chlorella parva, Chlorella pyrenoidosa, Chlorella phoiophila, Chlorella pringsheimii, Chlorella protothecoides, Chlorella Protat ecoides Var. acidicola, Chlorella regularis, Prionitis sternbergii, Chlorella regularis Var. minima, Chlorella regularis Var. umbricata, Chlorella reisiglii, Chlorella saecharophila, Chlorella saecharophila Var. ellipsoidea, Chlorella salina, Chlorella simplex, Chlorell sorokmiana, Chlorella sphaerica, Chlorella stigmatophora, Chlorella Var iellii, Chlorella vulgaris, Codium setchellii, Corallina vancouveriensis, Chlorella vulgaris Fo. tertia, Chlorella vulgaris Var. autotroph ica, Chlorella vulgaris Var. viridis, Chlorella vulgaris Var. vulgaris, Chlorella vulgaris Var vulgaris Fo. tertia, Chlorella vulgaris Var. vulgaris Fo. viridis, Chlorella Xamhella, Chlorella zofingiensis, Chlorella irebouxioides, Chlorococcum infusiovum, Chlorogoni N, Crypthecodinium cohnii, Cyclotella cryptica, Cyclotejla meneghiniana, Dimaliella hardawil, Dunaliella bioculata, Dimaliella granulate, Dunaliella maritime, Dunaliella minuta, Dimaliella parva, Dunaliella peircei, Dunaliella primolecta, Bossiella plumose, Dunaliella salina, Dimaliella terricoia, Dunaliella tertiolecta, Dunaliella viridis, Dunaliella tertioiecta, Eremosphaera viridis, Euglena gracilis, Fragilari crotonensis, Haematococcus pluvialis, Hochrysis galbana, Monaraphidium falcatus, Nannochloropsis salina, Navicida acce-piata, Navicula biskanterae, Navicula pseudotenelloides, Porphyridium cruentum, Porphyridium parvum, Scenedesmus dimorphus, Navicul pellicidosa, Navicida saprophtla, Odontella aurita, Tschia communis, Nitzschia alexandrine, Nitzschia clostenum, Nitzschia communis, Nitzschia D sipata, Nitzschia frustuhmi, Nitzschia hantzschiana, Nitzschia inconspicua, Nitzschia intermedia, Cladophora columbiana, Nitzschia microcephala, Nitzschia pusilla, Isochrysis galbana, Phaedactylum, Lyngbya majuscule, Aphanizomenonflos, Nitzschia pusilla E iptica, Nitzschia pusilla monoensis, Palmaria mollis, Rhodymenia palmata fistulinella mollis, Nitzschia quadrangular, Oocystis pusilla, Oscillatoria li.nme.tica, Acrosiphonia coalita, Oscillatoria subbrevis, Pamchlorelta kessleri, Pascheria acidophila, Phaeodactyhan tricomutwn, Tolypothrix tenuis, Hapalosiphon fontinalis, Pleurochrysis camerae, Pleurochrysis dentate, Pleurochrysis carterae, Prototheca wickerhamii, Prototheca stagnora, Prototheca ponoricensis, Prototheca moriformis, Prototheca zopfii, Pseudochlorella aquatica, Rhodococcus opaciis, Sarcinoid chrysophyte, Scenedesmus annatus, Scenedesmus obliquus, Scenedesmus quadricauda, Schizochytrmm, Spirulina platensis, Spirulina maxima, Synechocystisf, Tagetes erecta, Tetrasehnis suecica, Codium fragile, Thalassiosira weissflogii, Viridiella fridericiana, Palmaria palmate, Alaria esculenta, Saccharina latissima, Saccharina sessilis, Saccharina dentigera, Laminaria saccharina, Porphyra umbilicalis, Alaria marginata, Ulva lactuca, Ulva armoricana, Laminaria digitata, Himanthalia elongata, Ascophyllum nodosum, Laminaria longicruris, Scytosiphon dotyi, Scytosiphon lomentaria, Porphyra yezoensis, Focus vesiculosus, Kappaphycus alvarezii, Betaphycus gracilaria, Gelidium pterocladia, Soranthera ulvoidea, Chondrus crispus, Mastocarpus stellatus, Gracilaria edulis, Phaeostrophion irregulare, Enteromorpha intestinalis, Enteromorpha compressa, Enteromorpha flexuso, Pyropia yezoensis, Macrocystis pyrifera, Asparagopsis armata, Mazzaella flaccida, Iridaea flaccid, Mazzaella oregona, Iridaea oregona, Iridaea heterocarpa, Mazzaella parksii, Iridaea cornucopiae, Mazzaella splendens, Iridaea cordataor mixtures thereof. However, those skilled in the art will appreciate that it is possible to utilize any other species known in the art, without departing from the scope of the invention. The algae are commercially manufactured and available through various vendors in India and abroad. However, the algae employed in the present invention have been procured from foreign vendors.

According to yet another embodiment, algae is any one of *Spirulina, Arthrospira, Chlorella, Anabaena, Sargassum, Scenedesmus, Aphanizomenon, Dunaliella, Phymatolithion, Lithothamnium, Ascophyllum, Enteromorpha, Tetraselmis, Prymnesium, Chlamydomonas, Euglena, Caulerpa, Padina, Urophora, Chondria, Caulerpa, Lyngby, Prasiola, Gymnopilus, Melanothamnus, Turbeneria, Mastigocladopsis, Hydroclathrus, Padina, Cystoseira, Laminaria, Fucus, Ulva* or their species and mixtures thereof. According to further embodiment, algae can be *Spirulina Plantensis, Spirulina maxima, Anabaena cylindrica, Aphanizomenon Flos-Aquae, Enteromorpha intestinalis, Enteromorpha compressa, Enteromorpha flexuso, Fucus gardneri, Scenedesmus obliquus, Ascophyllum nodosum, Phymatolithion calcereum, Lithothamnium calcereum, Aphanizomenon Flos-Aquae, Dunaliella salina, Tetraselmis maculate, Prymnesium parvum, Chlamydomonas rheinhardii, Euglena gracilis, Caulerpa scalpelliformis, Padina pavonica, Sargassum tenerrimum, Urophora fasciata, Urophora lactuca, Sargassum wightii, Chondria armata, Caulerpa racemosa, Lyngby majuscule, Prasiola crispa, Gymnopilus edulis* or their species and mixtures thereof. However, those skilled in the art will appreciate that it is possible to utilize any other species of *Spirulina, Arthrospira, Anabaena, Scenedesmus, Sargassum, Ascophyllum, Aphanizomenon, Dunaliella, Phymatolithion, Lithothamnium, Tetraselmis, Prymnesium, Chlamydomonas, Euglena, Caulerpa, Padina, Urophora, Chondria, Caulerpa, Lyngby, Prasiola, Gymnopilus, Enteromorpha, Fucus* or mixtures thereof or different algaes known in the art, without departing from the scope of the invention. The algae are commercially manufactured and available through various vendors in India and abroad. However, the algae employed in the present invention have been procured from foreign vendors.

According to another embodiment, the algae is preferably one or more of *Spirulina* Sp., *Chlorella* Sp., *Ascophyllum* Sp., *Sargassum* Sp., *Lithothamnium* Sp., *Enteromorpha* Sp.

According to an embodiment, algae or their derivative is present in the range of 0.1% to 65% by weight of the total composition. According to an embodiment, algae or their derivative is present in the range of 0.1% to 60% by weight of the total composition. According to an embodiment, algae or their derivative is present in the range of 0.1% to 50% by weight of the total composition. According to an embodiment, algae or their derivative is present in the range of 0.1% to 40% by weight of the total composition. According to an embodiment, algae or their derivative is present in the range of 0.1% to 30% by weight of the total composition. According to an embodiment, algae or their derivative is present in the range of 0.1% to 20% by weight of the total composition. According to an embodiment, algae or their derivative is present in the range of 0.1% to 15% by weight of the total composition. According to an embodiment, algaeor their derivative is present in the range of 0.1% to 10% by weight of the total composition. According to an embodiment, algae or their derivative is present in the range of 0.1% to 5% by weight of the total composition.

According to an embodiment, water immiscible solvents include aromatic and non-aromatic hydrocarbons, halogenated aromatic and non-aromatic hydrocarbons, petroleum distillates, aromatic and non-aromatic ethers, esters or amides, oils or mixtures thereof. According to further embodiment the oils can be one or more of a mineral oil, petroleum oil, vegetable oil or animal oil or derivatives or mixtures thereof. However, those skilled in the art will appreciate that it is possible to utilize other water immiscible solvents without departing from the scope of the present invention.

The mineral oil or pertroleum oil can be one or more of aliphatic or isoparaffinic series, and mixtures of aromatic and aliphatic hydrocarbons; halogenated aromatic or aliphatic hydrocarbons. Paraffinic oil can be selescted from linear or branched C8 to C30 paraffins for example such as octane, nonane, decane, undecane, dodecane, tridecane, tetradecane, pentadecane, hexadecane, their mixtures, or mixtures thereof with higher boiling homologs, such as hepta-, octa-, nona-decane, eicosane, heneicosane, docosane, tricosane, tetracosane, pentacosane, and the branched chain isomers thereof, unsubstituted or substituted aromatic or cycloaliphatic C7 to C18 hydrocarbon compounds such as mono- or polyalkyl-substituted benzenes, or mono- or polyalkyl-substituted naphthalenes, or transesterification products thereof, liquid esters of C1 to C12 alcohols such as butanol, n-octanol, i-octanol, dodecanoi, cyclopentanol, cyclohexanol, cyclooctanol, ethylene glycol or propylene glycol with C2 to C12 carboxylic or polycarboxylic acids, such as caproic acid, capric acid, caprylic acid, pelargonic acid, succinic acid and glutaric acid; or with aromatic carboxylic acids such as benzoic acid, toluic acid, salicylic acid and phthalic acid, liquid amides of C1 to C5 amines, alkylamines or alkanolamines with C6 to C18 carboxylic acids, or derivatives thereof. Esters which can be used in the oil dispersions of the invention are benzyl acetate, caproic acid ethyl ester, pelargonic acid ethyl ester, benzoic acid methyl or ethyl ester, salicylic acid methyl, propyl, or butyl ester, diesters of phthalic acid with saturated aliphatic or alicyclic C1 to C12 alcohols, such as phthalic acid dimethyl ester, dibutyl ester, diisooctyt ester, or liquid amides of C1-C3 amines, alkylamines or alkanolamines with C6-C18 carboxylic acids or derivatives or mixtures thereof. However, those skilled in the art will appreciate that it is possible to utilize other mineral or pertroleum oils without departing from the scope of the present invention.

The vegetable oils can be one or more of seed oil. The vegetable oils can also include one or more of soy bean oil, rape seed oil, olive oil, castor oil, sunflower seed oil, coconut oil, corn oil, cotton seed oil, linseed oil, palm oil, peanut oil, safflower oil, sesame oil, kapok oil, papaya oil, camellia oil, rice bran oil, tung oil and the like; and esters of the above vegetable oils, or transesterification products thereof such as soy bean oilmethyl esters, ethyl esters, propyl esters, butyl esters or derivatives thereof. The animal oil can be one or more of whale oil, cod-liver oil, or mink oil. However, those skilled in the art will appreciate that it is possible to utilize other vegetable or animal oils without departing from the scope of the present invention.

The petroleum distillates include one or more of aromatic hydrocarbons derived from benzene, such as toluene, xylenes, other alkylated benzenes and the like, and naphthalene derivatives, aliphatic hydrocarbons such as hexane, octane, cyclohexane, and the like, mineral oils from the aliphatic or isoparaffinic series, and mixtures of aromatic and aliphatic hydrocarbons; halogenated aromatic or aliphatic hydrocarbons; vegetable, seed or animal oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like, and $C_1$-$C_6$ mono-esters derived from vegetable oils such as methyl oleate, methyl soyate, and methyl laurate, seed or animal oils; $C_1$-$C_6$ dialkyl amides of $C_6$-$C_{20}$ saturated and unsaturated aliphatic carboxylic acids; $C_1$-$C_{12}$ esters of aromatic carboxylic acids and dicarboxylic acids and $C_1$-$C_{12}$ esters of aliphatic and cycloaliphatic carboxylic acids; $C_4$-$C_{12}$ polyesters of dihydric, trihydric, or other lower polyalcohols such as, propylene glycol dioleate, di-octyl succinate, di-butyl adipate, di-octyl phthalate, and the like.

According to an embodiment, the composition includes organic solvents or cosolvents such as ethers like tetrahydrofuran and the like, alkylene glycol dialkyl ethers such as ethylene glycol diethyl ether and the like, amides such as dimethylformamide, dimethylacetamide or N-methylpyrrolidone and the like, ketones such as methyl ethyl ketone and the like, nitriles such as butyronitrile and the like, sulfoxides or sulfones such as dimethyl sulfoxide or sulfolane and the like, and alkylene carbonates such as propylene or butylene carbonate.

According to an embodiment, the water immiscible solvent is present in the concentration of 0.1% to 90% by weight of total composition. According to an embodiment, the water immiscible solvent is present in the concentration of 0.1% to 80% by weight of total composition. According to an embodiment, the water immiscible solvent is present in the concentration of 0.1% to 70% by weight of total composition. According to an embodiment, the water immiscible solvent is present in the concentration of 0.1% to 60% by weight of total composition. According to an embodiment, the water immiscible solvent is present in the concentration of 0.1% to 50% by weight of total composition. According to an embodiment, the water immiscible solvent is present in the concentration of 0.1% to 40% by weight of total composition. According to an embodiment, the water immiscible solvent is present in the concentration of 0.1% to 30% by weight of total composition.

According to an embodiment, the surfactants which are used in the composition include one or more of anionic, cationic, non-ionic, amphoteric and polymeric surfactants and can be employed as emulsifying agents, wetting agents, dispersing agents, suspending agents, or for other purposes. However, those skilled in the art will appreciate that it is possible to utilize other surfactants without departing from the scope of the present invention. The surfactants are commercially manufactured and available through various companies.

The anionic surfactants include one or more of, but not limited to a salt of fatty acid, a benzoate, a polycarboxylate, a salt of alkylsulfuric acid ester, alkyl ether sulfates, an alkyl sulfate, an alkylarylsulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyletherdisulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylenealkylaryl ether sulfate, alkyl sarcosinates, alpha olefin sulfonate sodium salt, alkyl benzene sulfonate or its salts, sodium lauroylsarcosinate, aSulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates—mono and other diesters, phosphate esters, alkyl naphthalene sulfonate-isopropyl and butyl derivatives, alkyl ether sulfates—sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methylpropane sulfonic acid, ammonium lauryl sulfate, ammonium perfluorononanoate, Docusate, Disodium cocoamphodiacetate, Magnesium laurethsulfate, Perfluorobutanesulfonic acid, Perfluorononanoic acid, carboxylates, Perfluorooctanesulfonic acid, Perfluorooctanoic acid, Phospholipid, Potassium lauryl sulfate, Soap, Soap substitute, Sodium alkyl sulfate, Sodium dodecyl sulfate, Sodium dodecylbenzenesulfonate, Sodium laurate, Sodium laurethsulfate, Sodium lauroylsarcosinate, Sodium myrethsulfate, Sodium nonanoyloxy benzenesulfonate, Sodium parethsulfate, alkyl carboxylates, Sodium stearate, alpha olefin sulphonates, Sulfolipid, naphthalene sulfonate salts, alkyl naphthalene sulfonate fatty acid salts, naphthalene sulfonate condensates-sodium salt, fluoro carboxylate, fatty alcohol sulphates, alkyl naphthalene sulfonate condensates-sodium salt, a naphthalene sulfonic acid condensed with formaldehyde or a salt of alkylnaphthalene sulfonic acid condensed with formaldehyde; or salts, derivatives thereof.

Cationic surfactants include one or more of, but not limited to Dialkyl dimethyl ammonium chlorides, Alkyl methyl ethoxylated ammonium chlorides or salts, Dodecyl-, Coco-, Hexadecyl-, Octadecyl-, Octadecyl/Behenyl-, Behenyl-, Cocoamidopropyl-, TrimethylAmmonium Chloride; Coco-, Stearyl-, bis(2-hydroxyethyl)Methyl Ammonium Chloride, Benzalkonium Chloride, Alkyl-, Tetradecyl-, Octadecyl-Dimethyl Benzyl Ammonium Chloride, Dioctyl-, Di(Octyl-Decyl)-, Didecyl-, Dihexadecyl-Distearyl-, Di(Hydrogenated Tallow)-Dimethyl Ammonium Chloride, Di(Hydrogenated Tallow) Benzyl-, Trioctyl-, Tri(Octyl-Decyl)-, Tridodecyl-, Trihexadecyl-Methyl Ammonium Chloride, Dodecyl Trimethyl-, Dodecyl Dimethyl Benzyl-, Di-(Octyl-Decyl) Dimethyl, Didecyl Dimethyl-Ammonium Bromide, quaternised amine ethoxylates, Behentrimonium chloride, Benzalkonium chloride, Benzethonium chloride, Benzododecinium bromide, Bronidox, quaternary ammonium salts Carbethopendecinium bromide, Cetalkonium chloride, Cetrimonium bromide, Cetrimonium chloride, Cetylpyridinium chloride, Didecyldimethylammonium chloride, Dimethyldioctadecylammonium bromide, Dimethyldioctadecyl ammonium chloride, Domiphen bromide, Lauryl methyl gluceth-10 hydroxypropyldimonium chloride, Octenidinedihydrochloride, Olaflur, N-Oleyl-1,3-propanediamine, Stearalkonium chloride, Tetramethylammonium hydroxide, Thonzonium bromide; salts or derivatives thereof.

The non-ionic surfactants include one or more of but not limited to polyol esters, polyol fatty acid esters, polyethoxylated esters, polyethoxylated alcohols, ethoxylated and propoxylated fatty alcohols, ethoxylated and propoxylated alcohols, EO/PO copolymers; di, tri-block copolymers; block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, sodium tallowate, polyoxyethylene glycol, sorbitan alkyl esters, sorbitan derivatives, fatty acid esters of sorbitan (Spans) and their ethoxylated derivatives (Tweens), and sucrose esters of fatty acids, Alkyl polyglycoside, Cetostearyl alcohol, Cetyl alcohol, Coc-amide DEA, Cocamide MEA, Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitanmonolaurate, Sorbitanmonostearate, Sorbitantristearate, Stearyl alcohol, Surfactin, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, ethylene oxide propylene oxide block copolymer, tributylphenoxypolyethoxy ethanol, octylphenoxypolyethoxy ethanol, etho-propoxylatedtristyrylphenols, ethoxylated alcohols, polyoxy ethylene sorbitan, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethyleneglycerin fatty acid ester, Alcohol ethoxylates—C6 to C16/18 alcohols, linear and branched, Alcohol alkoxylates—various hydrophobes and EO/PO contents and ratios, Fatty acid esters—mono and diesters; lauric, stearic and oleic; Glycerol esters—with and without EO; lauric, stearic, cocoa and tall oil derived, Ethoxylated glycerine, Sorbitan esters—with and without EO; lauric, stearic and oleic based; mono and trimesters, Castor oil ethoxylates—5 to 200 moles EO; non-hydrogenated and hydrogenated, Polyethylene glycol—200, 300, 400, 600, 1450, 3350 and 8000, Methyl capped polyethylene glycol—350 and 550, Block polymers, Alkyl polyglucosides, Amine oxides-ethoxylated and non-ethoxylated; alkyl dimethyl, Fatty amine ethoxylates-coco, tallow, stearyl, oleyl amines, a polyoxyethylene hydrogenated castor oil or a polyoxypropylene fatty acid ester; salts or derivatives, and mixtures thereof.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates—sodium lauriminodi-propionate, Cocoamidopropyl hydroxyl sulfobetaine, imidazolines, phospholipids phosphatidylserine, phosphatidylethanolamine, phosphatidylcholine, and sphingomyelins, Lauryl Dimethylamine Oxide, alkyl amphoacetates and proprionates, alkyl Ampho(di)acetates, and diprionates, lecithin and ethanolamine fatty amides; or salts, derivatives thereof.

Surfactants that are commercially available under the trademark but are not limited to Atlas G5000, Atlas 500T, TERMUL 3512, TERMUL 3015, TERMUL 5429, TERMUL 2510, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC 0E-20, Triton N-101, Triton X-100, Tween 20, 40, 60, 65, 80, Span20, 40, 60, 80, 83, 85, 120, Brij®, Atlox4912, Atlox R200, ECOTERIC®, ECOTERIC® T85, ECOTERIC® T20, TERIC 12A4, EULSOGEN® 118.

According to an embodiment, the surfactant is present in the concentration of 0.1% to 80% by weight of total composition. According to an embodiment, the surfactant is present in the concentration of 0.1% to 60% by weight of total composition. According to an embodiment, the surfactant is present in the concentration of 0.1% to 50% by weight of total composition. According to an embodiment, the surfactant is present in the concentration of 0.1% to 40% by weight of total composition. According to an embodiment, the surfactant is present in the concentration of 0.1% to 30% by weight of total composition. According to an embodiment, the surfactant is present in the concentration of 0.1% to 20% by weight of total composition.

According to an embodiment, the ratio of algae to surfactant present in the composition is 650:1 to 1:800. According to an embodiment, the ratio of algae to surfactant present in the composition is 650:1 to 1:600. According to an embodiment, the ratio of algae to surfactant present in the composition is 650:1 to 1:500. According to an embodiment, the ratio of algae to surfactant present in the composition is 650:1 to 1:450. According to an embodiment, the ratio of algae to surfactant present in the composition is 650:1 to 1:300. According to an embodiment, the ratio of algae to surfactant present in the composition is 650:1 to 1:200. According to an embodiment, the ratio of algae to surfactant present in the composition is 650:1 to 1:100. According to an embodiment, the ratio of algae to surfactant present in the composition is 650:1 to 1:50. According to an embodiment, the ratio of algae to surfactant present in the composition is 500:1. According to an embodiment, the ratio of algae to surfactant present in the composition is 300:1. According to an embodiment, the ratio of algae to surfactant present in the composition is 200:1. According to an embodiment, the ratio of algae to surfactant present in the composition is 100:1. According to an embodiment, the ratio of algae to surfactant present in the composition is 50:1. According to an embodiment, the ratio of algae to surfactant present in the composition is 40:1. According to an embodiment, the ratio of algae to surfactant present in the composition is 30:1. According to an embodiment, the ratio of algae to surfactant present in the composition is 1:1. According to an embodiment, the ratio of algae to surfactant present in the composition is 1:10. According to an embodiment, the ratio of algae to surfactant present in the composition is 1:20. According to an embodiment, the ratio of algae to surfactant present in the composition is 1:30. According to an embodiment, the ratio of algae to surfactant present in the composition is 1:40. According to an embodiment, the ratio of algae to surfactant present in the composition is 1:45. According to an embodiment, the ratio of algae to surfactant present in the composition is 1:50. to an embodiment, the ratio of algae to surfactant present in the composition is 1:100. According to an embodiment, the ratio of algae to surfactant present in the composition is 1:200. According to an embodiment, the ratio of algae to surfactant present in the composition is 1:300. According to an embodiment, the ratio of algae to surfactant present in the composition is 1:400. According to an embodiment, the ratio of algae to surfactant present in the composition is 1:500.

According to an embodiment, the composition further includes agrochemically acceptable excipients selected from rheology modifiers or viscosity modifying agent or anti-settling agents, buffers or pH regulators or neutralising agents, antifoaming agent, antioxidants, colouring agents, preservatives, sticking agents, spreading agents, odorants, penetration aids, sequestering agents, stabilizers and processing additives. However, those skilled in the art will appreciate that it is possible to utilize other agrochemically acceptable excipients without departing from the scope of the present invention. The agrochemically acceptable excipients are commercially manufactured and available through various companies.

According to an embodiment, the agricultural excipient is present in range of 0.1% to 95% by weight of the total composition. According to an embodiment, the agricultural excipient is present in range of 0.1% to 90% by weight of the total composition. According to an embodiment, the agricultural excipient is present in range of 0.1% to 80% by weight of the total composition. According to an embodiment, the agricultural excipient is present in range of 0.1% to 70% by weight of the total composition. According to an embodiment, the agricultural excipient is present in range of 0.1% to 60% by weight of the total composition. According to an embodiment, the agricultural excipient is present in range of 0.1% to 50% by weight of the total composition. According to an embodiment, the agricultural excipient is present in range of 0.1% to 40% by weight of the total composition. According to an embodiment, the agricultural excipient is present in range of 0.1% to 30% by weight of the total composition. According to an embodiment, the agricultural excipient is present in range of 0.1% to 15% by weight of the total composition.

According to an embodiment, the structuring agents which are used in the composition include, but not limited to one or more of thickeners, viscosity modifiers, tackifiers, suspension aids, rheological modifiers or anti-settling agents. A structuring agent prevents sedimentation of the active ingredient particles in the composition on prolonged storage.

According to an embodiment, the structuring agents which are used in the composition include, but not limited to one or more polymers such as polyacrylics, polyacrylamides, hydrophobically modified cellulose derivatives, copolymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays with high surface area silica and polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylatedanhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine, poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such, starch acetates, starch hydroxyethyl ethers, ionic starches, long-chain alkyl starches, dextrins, maltodextrin, corn starch, amine starches, phosphates starches, and dialdehyde starches; plant starches such as corn starch and potato starch; other carbohydrates such as pectin, dextrin, amylopectin, xylan, glycogen, agar, gluten, alginic acid, phycocolloids, chitin, or derivatives thereof. However, those skilled in the art will appreciate that it is possible to utilize other conventionally known structuring agents without departing from the scope of the present invention.

Preferred structuring agents include one or more of hydrophobically modified silica, bentonite, kaolin, attapglutite, hydrophobically modified starch. The structuring agents are commercially manufactured and available through various companies.

According to an embodiment, the structuring agent is present in the concentration of 0.01% to 5% by weight of the total composition. According to an embodiment, the structuring agent is present in the concentration of 0.01% to 4% by weight of the total composition. According to an embodiment, the structuring agent is present in the concentration of 0.01% to 3% by weight of the total. According to an embodiment, the structuring agent is present in the concentration of 0.01% to 2% by weight of the total composition. According to an embodiment, the structuring agent is present in the concentration of 0.01% to 1% by weight of the total. According to an embodiment, the structuring agent is present in the concentration of 0.01% to 0.1% by weight of the total composition.

According to an embodiment, the spreading agents which are used in the composition include, but not limited to one or more of cellulose powder, dextrin, modified starch, cross-linked poly(vinylpyrrolidone), a copolymer of maleic acid with a styrene compound, a (meth)acrylic acid copolymer, a half ester of a polymer consisting of polyhydric alcohol with dicarboxylic anhydride, a water-soluble salt of polystyrene-sulfonic acid, fatty acids, latex, aliphatic alcohols, vegetable oils such as cottonseed, or inorganic oils, petroleum distillates, modified trisiloxanes, polyglycol, polyethers, clathrates or salts or derivatives thereof. However, those skilled in the art will appreciate that it is possible to utilize other conventionally known spreading agents without departing from the scope of the present invention. The spreading agents are commercially manufactured and available through various companies.

According to an embodiment, the spreading agent is present in the range of 0.1% to 50% by weight of the total composition. According to an embodiment, the spreading agent is present in the range of 0.1% to 40% by weight of the total composition. According to an embodiment, the spreading agent is present in the range of 0.1% to 30% by weight of the total composition. According to an embodiment, the spreading agent is present in the range of 0.1% to 10% by weight of the total composition.

According to an embodiment, the penetrant which is used in the composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethyl formamide, dimethyl acetamide, dimethyl sulfoxide, polyoxyethylene trimethylol propane monooleate, polyoxyethylene trimethylol propanedioleate, polyoxyethylene trimethylol propane trioleate, polyoxyethylene sorbitan monooleate, polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, penetrant is present in the range of 0.1% to 30% by weight of the total composition.

According to an embodiment, the antifoaming agents or defoamers which are used in the composition include, but not limited to one or more of silica, siloxane, silicone dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoroorganic compounds. However, those skilled in the art will appreciate that it is possible to utilize other conventionally known antifoaming agents without departing from the scope of the present invention. The antifoaming agents are commercially manufactured and available through various companies.

According to an embodiment, the anti-foaming agent is present in the range of 0.01% to 20% by weight of the total composition. According to an embodiment, the anti-foaming agent is present in the range of 0.01% to 10% by weight of the total composition. According to an embodiment, the anti-foaming agent is present in the range of 0.01% to 5% by weight of the total composition. According to an embodiment, the anti-foaming agent is present in the range of 0.01% to 1% by weight of the total composition.

According to an embodiment, the pH-adjusters or buffers or neutralizing agents which are used in the composition include both acids and bases of the organic or inorganic type and mixtures thereof. According to further embodiment, pH-adjusters or buffers or neutralizing agents include, but not limited to one or more of organic acids, inorganic acids and alkali metal compounds or salts, derivatives thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include, but not limited to one or more of hydroxides of alkali metals such as sodium hydroxide and potassium hydroxide, carbonates of alkali metals such as sodium carbonate, hydrogencarbonates of alkali metals such as sodium hydrogencarbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention. The pH-adjusters or buffers or neutralizing agents are commercially manufactured and available through various companies.

According to an embodiment, the pH-adjuster or buffer is present in the range of 0.01% to 20% by weight of the total composition. According to an embodiment, the pH-adjuster or buffer is present in the range of 0.01% to 10% by weight of the total composition. According to an embodiment, the pH-adjuster or buffer is present in the range of 0.01% to 5% by weight of the total composition. According to an embodiment, the pH-adjuster or buffer is present in the range of 0.01% to 1% by weight of the total composition.

According to an embodiment, the stabilizers which are used in the composition include, but not limited to one or more of peroxide compounds such as hydrogen peroxide and organic peroxides, alkyl nitrites such as ethyl nitrite and alkyl glyoxylates such as ethyl glyoxylate, zeolite, antioxidants such as phenol compounds, phosphoric acid compounds and the like; ultraviolet absorbers such as benzophenone compounds or derivatives thereof. However, those skilled in the art will appreciate that it is possible to utilize other conventionally knownstabilizerswithout departing from the scope of the present invention. The stabilizers are commercially manufactured and available through various companies.

According to an embodiment, the stabilizer is present in the range of 0.1% to 30% by weight of the total composition. According to an embodiment, the stabilizer is present in the range of 0.1% to 20% by weight of the total composition.

According to an embodiment, the stabilizer is present in the range of 0.1% to 10% by weight of the total composition.

According to an embodiment, the preservatives which are used in the composition include but not limited to, one or more of bactericides, anti-fungal agents, biocides, antimicrobial agents, and antioxidant. Non limiting examples of preservatives include one or more of paraben, its esters and salts, propionic acid and its salts, 2,4-hexadienoic acid (sorbic acid) and its salt, formaldehyde and paraformaldehyde, 2-hydroxybiphenyl ether and its salts, inorganic sulfites and bisulfites, sodium iodate, chlorobutanol, dehydraacetic acid, formic acid, 1,6-bis(4-amidino-2-bromophenoxy)-n-hexane and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl)urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2,4-dioximidazolidin-5-yl)urea), poly (hexamethylene diguanide) hydrochloride, 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy) propane-1,2-diol, Hyamine, alkyl(C8-C18) dimethylbenzylammonium chloride, alkyl(C8-C18) dimethylbenzylammonium bromide, alkyl(C8-C18) dimethylbenzylammoniumsaccharinate, benzyl hemiformal, 3-iodo-2-propynyl butylcarbamate, sodium hydroxymethylaminoacetate, cetyl-trimethylammonium bromide, cetylpyridinium chloride, and derivatives of 2-H isothiazol-3-one (so-called isothiazolone derivatives) such as alkylisothiazolones (for example 2-methyl-2H-isothiazol-3-one, MIT, chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Proxel® from ICI or Acticide® RS from Thor Chemie and Kathon® MK from Rohm & Haas, Bacto-100, thimerosal, Sodium Propinoate, Sodium Benzoate, Propyl Paraben, Propyl Paraben Sodum, Potassium Sorbate, Potassium Benzoate, Phenyl Mercuric Nitrate, Phenyl Etehyl Alcohol, Sodium, Ethylparaben, Methylparaben, Butylparaben, Bezyla Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2',4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and boraxor salts or derivatives thereof. Antioxidants includes but not limited to one or more of imidazole and imidazole derivatives (e.g. urocanic acid), 4,4'-thiobis-6-t-butyl-3-methylphenol, 2,6-di-t-butyl-p-cresol (BHT), and pentaerythrityltetrakis [3-(3,5,-di-t-butyl-4-hydroxyphenyl)]propionate; amine antioxidants such as N,N'-di-2-naphthyl-p-phenylenediamine; hydroquinoline antioxidants such as 2,5-di(t-amyl)hydroquinoline; phosphorus-containing antioxidants such as triphenyl phosphate, caro-tenoids, carotenes (e.g. α-carotene, β-carotene, lycopene) and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, N-acetyl, methyl, ethyl, propyl, amyl, butyl, lauryl, palmitoyl, oleyl, γ-linoleyl, cholesteryl and glyceryl esters thereof), and salts thereof, dilaurylthiodipropionate, distearylthiodipropion-ate, thiodipropionic acid and derivatives thereof (esters, ethers, lipids, nucleotides, nucleosides and salts), and sulfoximine compounds (e.g. buthioninesulfoximi-nes, homocysteine sulfoximine, buthionine sulfones, penta-, hexa-, heptathioninesul-foximine) in very low tolerated doses (e.g. pmol/kg to pmol/kg), α-hydroxy acids (e.g. citric acid, lactic acid, malic acid), humic acids, gallic esters (e.g. propyl, octyl and dodecyl gallate), unsaturated fatty acids and derivatives, hydroquinone and derivatives thereof (e.g. arbutin), ubiquinone and ubiquinol, and derivatives thereof, ascorbyl palmitate, stearate, di-palmitate, acetate, Mg ascorbyl phosphates, disodiumascorbyl phosphate and sulfate, potassium ascorbyltocopheryl phosphate, isoascorbic acid and derivatives thereof, the coniferyl benzoate of benzoin resin, rutin, rutinic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3,5-di-tert-butyl-4-hydroxyphenyl)propionate, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). However, those skilled in the art will appreciate that it is possible to utilize other conventionally known preservatives without departing from the scope of the present invention. The preservatives are commercially manufactured and available through various companies.

According to an embodiment, the preservative or bactericides or anti-fungal agents or biocides or anti-microbial agents or antioxidant is present in the range of 0.1% to 20% by weight of the total composition. According to further embodiment, the preservative or bactericides or anti-fungal agents or biocides or anti-microbial agents or antioxidant is present in the range of 0.1% to 10% by weight of the total composition. According to further embodiment, the preservative or bactericides or anti-fungal agents or biocides or anti-microbial agents or antioxidant is present in the range of 0.1% to 5% by weight of the total composition. According to further embodiment, the preservative or bactericides or anti-fungal agents or biocides or anti-microbial agents or antioxidant is present in the range of 0.1% to 1% by weight of the total composition.

According to an embodiment, the agricultural composition further comprise one or more of additional active selected from one or more of biostimulants, microbials, pesticidal actives, water soluble or water insoluble fertilizers, macronutrients, micronutrients.

According to an embodiment, the pesticidal actives include one or more of antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, a insect growth regulator, a mammal repellent, a mating disrupter, a desiccant, a disinfectant, a molluscicide, a antimicrobial, a miticide, an ovicide, a fumigant, a plant activator, a rodenticide, a synergist, a virucide, a repellent, a microbial pesticide, a plant incorporated protectant, other miscellaneous pesticidal active, or salts, derivatives and mixtures thereof.

According to an embodiment, the additional active ingredient added to the oil dispersion composition is present in the range of 0.1% to 95% by weight of the total composition. According to an embodiment, the additional active ingredient is present in the range of 0.1% to 80% by weight of the total composition. According to an embodiment, the additional active ingredient is present in the range of 0.1% to 70% by weight of the total composition. According to an embodiment, the additional active ingredient is present in the range of 0.1% to 60% by weight of the total composition. According to an embodiment, the additional active ingredient is present in the range of 0.1% to 50% by weight of the total composition. According to an embodiment, the additional active ingredient is present in the range of 0.1% to 30% by weight of the total composition. According to an embodiment, the additional active ingredient is present in the range of 0.1% to 20% by weight of the total composition.

According to an embodiment, the composition of the invention is easily pourable. The pourability is the measure of percent of residue.

According to an embodiment, the pourability of the oil dispersion composition is determined as per CIPAC MT-148.1 by allowing the oil dispersion to stand for 24 hours and the amount remaining in the container after a standardized pouring procedure is determined. The container is rinsed and the amount then remaining is determined and the maximum residue in percent is calculated. According to further embodiment, the pourability of oil dispersion composition is less than 5% residue. According to further embodiment, the pourability of oil dispersion composition is preferably less than 2.5% residue. According to further embodiment, the pourability of oil dispersion composition is more preferably less than 2.0% residue.

According to an embodiment, oil dispersion composition has a particle size in the range of 0.1 microns to 50 microns. Improved physical stability and agricultural activity was observed with composition having particles in the size range of 0.1 to 50 microns. Thus, the particle size range of 0.1 to 50 microns of the agricultural composition was found to be important not only in terms of ease of application but also in terms of efficacy.

According to further embodiment, the oil dispersion composition has a particle size in the range of 0.1 microns to 40 microns. According to further embodiment, oil dispersion composition has a particle size in the range of 0.1 microns to 30 microns. According to further embodiment, the oil dispersion composition has a particle size in the range of 0.1 microns to 20 microns. According to further embodiment, the oil dispersion composition has a particle size in the range of 0.1 microns to 15 microns. According to further embodiment, the oil dispersion composition has a particle size in the range of 0.1 microns to 10 microns. According to further embodiment, the oil dispersion composition has a particle size in the range of 0.1 microns to 5 microns.

According to an embodiment, the composition of the invention exhibits superior viscosity. The viscosity of a fluid is a measure of its resistance to gradual deformation by shear stress or tensile stress. According to an embodiment, viscosity of the oil dispersions is determined as per CIPAC MT-192. A sample is transferred to a standard measuring system. The measurement is carried out under different shear conditions and the apparent viscosities are determined. During the test, the temperature of the liquid is kept constant. According to an embodiment, the oil dispersion composition has a viscosity at 25° C. of about 10 cps to about 3000 cps. According to an embodiment, the oil dispersion composition has a viscosity at 25° C. of about 100 cps to about 2500 cps. According to an embodiment, the oil dispersion composition has a viscosity at 25° C. of about 10 cps to about 2000 cps. According to an embodiment, the oil dispersion composition has a viscosity at 25° C. of about 10 cps to about 1000 cps. According to an embodiment, the oil dispersion composition has a viscosity at 25° C. of about 10 cps to about 500 cps. Too viscous compositions tend to form cakes and are unpourable.

According to an embodiment, the composition exhibits good suspensibility. The oil dispersion composition is homogenous and does not settle or form cake preventing loss of actives during storage and application to the crops. The suspensibility of the suspension is the amount of active ingredient suspended after a given time in a column of liquid, of stated height, expressed as a percentage of the amount of active ingredient in the original suspension. The suspensibility of oil suspension concentrate is determined as per CIPAC MT-161 by preparing 250 ml of diluted suspension, allowing it to stand in a measuring cylinder under defined conditions, and removing the top nine-tenths. The remaining tenth is then assayed chemically, gravimetrically or by solvent extraction, and the suspensibility is calculated.

According to an embodiment, the composition has suspensibility of at least 30%.
According to an embodiment, the composition has suspensibility of at least 40%.
According to an embodiment, the composition has suspensibility of at least 50%.
According to an embodiment, the composition has suspensibility of at least 60%.
According to an embodiment, the composition has suspensibility of at least 70%.
According to an embodiment, the composition has suspensibility of at least 80%.
According to an embodiment, the composition has suspensibility of at least 90%.
According to an embodiment, the composition has suspensibility of at least 95%.
According to an embodiment, the composition has suspensibility of at least 99%.
According to an embodiment, the composition has suspensibility of more than 30% on accelerated storage. According to an embodiment, the composition has suspensibility of more than 40% on accelerated storage. According to an embodiment, the composition has suspensibility of more than 50% on accelerated storage. According to an embodiment, the composition has suspensibility of more than 60% on accelerated storage. According to an embodiment, the composition has suspensibility of more than 70% on accelerated storage. According to an embodiment, the composition has suspensibility of more than 80% on accelerated storage. According to an embodiment, the composition has suspensibility of more than 90% on accelerated storage. According to an embodiment, the composition has suspensibility of more than 95% on accelerated storage.

According to an embodiment, the oil dispersion composition has good wet sieve retention value demonstrating good performance of the composition. In a wet sieve test the residue remaining on a sieve is determined after dispersion to ensure no unacceptable residue remains which causes the blockage of nozzles or filters on application equipment. Samples can be tested for wet sieve retention as per the CIPAC Handbook, "MT 185 Wet Sieve Test". A sample of the formulation is dispersed in water or allowed to completely disperse in water and the suspension formed is transferred to the sieve and washed. The amount of the material retained on the sieve is determined by drying and weighing. According to an embodiment, the oil dispersion composition has a wet sieve retention value on a 75 micron sieve of less than 0.5%. According to an embodiment, the oil dispersion composition has a wet sieve retention value on a 75 micron sieve of less than 0.2%. According to an embodiment, the oil dispersion composition has a wet sieve retention value on a 75 micron sieve of less than 0.1%. The oil dispersion composition thus has a good wet sieve retention value required for easy application of the formulation preventing clogging of the nozzles or filter equipments.

According to an embodiment, the dispersion stability of the composition is measured as per CIPAC MT 180. A dispersion of prescribed concentration in water is prepared and aliquots are placed in two graduated emulsion tubes, which are then allowed to remain undisturbed for specified time in a upright and inverted positions at a constant temperature. The dispersion characteristics are observed immediately after the preparation of the dispersion, after a specified time, and after redispersion. According to an embodiment, the oil dispersion composition disperses immediately. According to an embodiment, the oil dispersion composition has dispersion stability for at least 30 minutes. According to an embodiment, the oil dispersion composition has dispersion stability for at least 60 minutes. According to an embodiment, an oil dispersion composition has dispersion stability for at least 24 hours. The composition of the present invention is stable, disperses readily and even after 30 minutes and 24 hours without forming sediment or free oil layers and can be sprayed easily.

According to an embodiment the invention further relates to the process of preparation of the oil dispersion composition. The process involves mixing water immiscible solvent, at least one algae, one or more of surfactant and optionally one or more other agricultural excipients under high shear, thereby grinding the sample to desired particle size to obtain the oil dispersion composition.

According to an embodiment, the process involves mixing of at least one water immiscible solvent, one or more surfactant to obtain a solvent-excipient mixture. The solvent mixture is optionally heated at 70-80° C. depending on the physical nature of the excipient. The solvent mixture is cooled down to room temperature. Further, adding at least one algae and other optional agrochemical excipient to the solvent mixture to obtain a homogenized solution. Milling homogenized solution for about 15-30 minutes to obtain a dispersed medium of particle size in the range of 0.1-50 microns. During preparation of the oil dispersion composition, the algae undergoes high shear resulting in the lysis of the cell. However, despite the fact that the cells are lysed, it is surprisingly observed that the oil concentrate comprising the algae, according to the current invention, demonstrate excellent efficacy when applied to the seeds, seedling, crops, a plant, plant propagation material, locus, parts thereof or to the surrounding soil.

According to an embodiment, the invention further relates to the method of application of an effective amount of the composition, wherein the composition is applied to crops, plants, or locus thereof through foliar spray or soil application.

According to an embodiment, the invention further relates to a method of improving the crop health, improving the crop nutrition, protecting the crop, enhancing the crop yield, strengthening the plant, the method comprising treating at least one of seeds, seedling, crops, a plant, plant propagation material, locus, parts thereof or to the surrounding soil with effective amount of the agricultural composition.

The composition according to the invention, demonstrates enhanced physical properties such as stability both on storage and after application, superior suspensibility, pourability, dispersion or emulsion stability. The present invention provides for the stable oil dispersion composition having increase rain fastness and exhibits enhanced efficacy. It also offers the users homogeneous application of the composition.

The composition of the invention is useful to improve, enhance or increase crop characteristics such as crop yield, crop nutrients uptake, emergence, plant vigour, bigger leaf blade, stronger and more productive tillers, photosynthetic activity, earlier flowering, early seed germination, early grain maturity, increased shoot growth, and other plant growth characteristics at a reduced application of the composition comprising at least one algae and at least one excipeint.

Surprisingly, the agricultural composition according to the invention demonstrates enhanced, efficacious and superior behaviour in the fields as compared to other formulations. In fact, various advantageous properties associated with the compositions according to the invention, include but are not limited to a reduction in the rate of application of the active ingredients, adequate control of the pests/weeds, enhanced nutritive value of the crop, advantageous behaviour during formulating and/or upon application, improved penetration, better effect due to rainfastedness, improved stability, improved toxicological and/or ecotoxicological behaviour, highly safe to the user and to the environment, saves labour costs and other advantages familiar to a person skilled in the art.

The rates of application or the dosage of the composition depends on the type of use, the type of crops, target yield, or the specific active ingredients in the composition but is such that the agrochemical active ingredient when applied in an effective amount to provide the desired action (such as nutrient uptake, plant vigor, crop yield).

A. Preparation Examples

The following examples illustrate the basic methodology and versatility of the composition of the invention. Algae and the selected excipients are exemplified in the preparatory examples and can be replaced by any other algae or mixtures of algae or any other agrochemically acceptable excipient. It should be noted that this invention is not limited to these exemplifications.

Example 1

Oil dispersion composition of 22% *Spirulina platensis.* 13 parts of castor oil ethoxylates are mixed homoenously with 50 parts of sunflower seed oil. 22 parts of *Spirulina* was added to the obtained mixture. The blend obtained was mixed in suitable mixing equipment and milled to form a slurry or wet mix. 15 parts of hydrophobically modified silica is added to the slurry to obtain a stable homogenous oil dispersion. The composition had the following particle size of less than 4 microns. The composition had suspensibility of 95%, wet sieve retention on a 75 micron sieve is 0.03%, pourability of 0.5% residue, viscosity of 650 cps. The composition further demonstrated suspensibility of about 91% under accelerated storage condition and dispersion stability for about 37 hours.

Example 2

Oil dispersion composition of 30% *Lithothamanium calcereum*: This composition was prepared similar to Example 1 using 30 parts of *Lithothamanium calcereum*, 45 parts of soyabean oil, 10 parts of glyceryl laurate, 15 parts of polyethylene glycol. The composition had particle size of 25 microns, viscosity of 2000 cps, pourability of 1.8% residue, wet sieve retention of 0.07% and suspensibility of 85%. The composition has suspensibility of 80% under accelerated storage condition and dispersion stability for about 24 hours.

Example 3

Oil dispersion composition of 22% *Chlorella pyrenoidosa*: This composition was prepared similar to Example 1 using 22 parts of *Chlorella pyrenoidosa*, 55 parts of paraffin oil, 7.5 parts of ethylene oxide-propylene oxide block copolymer and 15.5 parts of monoethylene glycol. The composition had particle size of 18 microns, viscosity of 1500 cps, pourability of 3.5% residue, wet sieve retention of 0.03% and suspensibility of 68%. The composition had suspensibility of 62% under accelerated storage condition and dispersion stability for about 30 hours.

Example 4

Oil dispersion composition of 15% *Ascophyllum nodosum*: This composition was prepared similar to Example 1 using 15 parts of *Ascophyllum nodosum*, 65 parts of octaneamide, 12 parts of polysorbate 80 and 8 parts of precipitated silica. The composition had particle size of 11 microns, viscosity of 700 cps, pourability of 2% residue, wet sieve retention of 0.1% and suspensibility of 88%. The composition had suspensibility of 84% under accelerated storage condition and dispersion stability for about 25 hours.

Example 5

Oil dispersion composition of 50% *Enteromorpha prolifera*. This composition was prepared similar to Example 1 using 50 parts of *Enteromorpha prolifera*, 28 parts of tung oil, 20 parts of sorbiatn mono-oleate and 2 parts of bentonite. The composition had particle size of 10 microns, viscosity of 1200 cps, pourability of 1.5% residue, wet sieve retention of 0.11% and suspensibility of 93%. The composition had suspensibility of 91% under accelerated storage condition and dispersion stability for about 29 hours.

Example 6

Oil dispersion composition of 10% *Sargassum vulgare*. This composition was prepared similar to Example 1 using 10 parts of *Sargassum vulgare*, 60 parts of cod liver oil, 22 parts of sorbitan mono-oleate, 8 parts of acrylic polymer. The composition had particle size of 15 microns, viscosity of 500 cps, pourability of 1.5% residue, wet sieve retention of 0.06% and suspensibility of 75%. The composition had suspensibility of 68% under accelerated storage condition and dispersion stability for about 18 hours.

Example 7

Oil dispersion composition of 18% algal mixture (*Spirulina* and *Ascophyllum*). This composition was prepared similar to Example 1 using 10 parts of *Spirulina* and 8 parts of *Ascophyllum*, 60 parts of soya methyl ester, 21 parts of alkylated resin, 1 part of carboxymethyl cellulose. The composition had particle size of 8 microns, viscosity of 400 cps, pourability of 1% residue, wet sieve retention of 0.18% and suspensibility of 94%. The composition had suspensibility of 87% under accelerated storage condition and dispersion stability for about 26 hours.

B. Field Studies

Field Study 1: To study efficacy of various algal oil dispersion composition on Tomato crop.

The field trials were carried out to observe the effect of oil dispersion composition of different algal species on yield and yield attributing parameters in Tomato at Niphad, Maharashtra. The trial was laid out during Kharif season in Randomized Block Design (RBD) comprising ten treatments as described below including untreated control, replicated three times.

For each treatment, plot size of 40 sq·m (8 m×5 m) was maintained. The treatments as per prescribed dose were applied as foliar at 30 days after planting of the tomato crops and spray application was repeated twice a week. The tomato crop in trial field was raised following good agricultural practices.

Details of Experiment

- a) Trial Location: Niphad (Maharashtra)
- b) Crop: Tomato (Avinash)
- c) Experiment season: Kharif 2019-20 (June to October)
- d) Trial Design: Randomized Block Design
- e) Replications: Three
- f) Treatment: Ten
- g) Plot size: 8 m×5 m=40 sq·m
- h) Date of sowing: Apr. 6, 2019
- i) Date of Application: 1st—May 7, 2019; 2nd—14 Jul. 2019; 3rd—25 Jul. 2019
- j) Method of application: Foliar spray using water volume @ 500 L/ha The observations were recorded and mean data is presented in table 1 to enumerate the impact of different treatments.

TABLE 1

Efficacy data observed with algal oil dispersion treatments on Tomato crop.

| | Treatment details | Dose of Product in gm or ml/L water | Mean No. of flower/ bunch* | 100 fruit weight (kg) | Fruit set (%) | Fruit yield (Qtl/acre) | % Increase in Yield |
|---|---|---|---|---|---|---|---|
| T1 | 10% Spirulina Oil Dispersion as per the embodiment of present invention | 2 ml | 5.52 | 9.10 | 88.1 | 376.1 | 16.2 |

TABLE 1-continued Efficacy data observed with algal oil dispersion treatments on Tomato crop.

| | Treatment details | Dose of Product in gm or ml/L water | Mean No. of flower/bunch* | 100 fruit weight (kg) | Fruit set (%) | Fruit yield (Qtl/acre) | % Increase in Yield |
|---|---|---|---|---|---|---|---|
| T2 | 20% Chlorella Oil Dispersion as per the embodiment of present invention | 2 ml | 5.18 | 9.16 | 86.3 | 374.5 | 15.7 |
| T3 | 15% Ascophyllum Oil Dispersion as per the embodiment of the present invention | 2 ml | 5.32 | 9.01 | 86.8 | 371.2 | 14.6 |
| T4 | Enteromorpha Prolifera Oil dispersion (20%) as per embodiment of the present invention | 2 ml | 5.41 | 9.15 | 87.9 | 376 | 15.3 |
| T5 | 10% Spirulina powder | 2 g | 4.71 | 8.67 | 79.5 | 355.6 | 9.8 |
| T6 | 20% Chlorella powder | 2 g | 4.56 | 8.72 | 74.1 | 352.2 | 8.8 |
| T7 | 15% Ascophyllum powder | 2 g | 4.63 | 8.69 | 75.2 | 335.9 | 3.7 |
| T8 | 20% Enteromorpha Prolifera powder | 2 g | 4.59 | 8.65 | 72.1 | 342.4 | 5.7 |
| T9 | Protune 80 | 2 g | 4.67 | 8.62 | 73.8 | 348.9 | 7.8 |
| T10 | Untreated | — | 4.41 | 8.56 | 73.3 | 323.8 | 0.0 |

*Mean of 5 bunch/plant and 10 plants each plot

From Table 1, it was observed that treatment T1 (10% *Spirulina* Oil dispersion) as per embodiment of the present invention had a fruit yield of 376.1 Qtl/acre whereas treatment T5 (10% *Spirulina* powder) had a fruit yield of 355.6 Qtl/acre and treatment T9 (Protune 80) had a fruit yield of 348.9 Qtl/acre. The percent increase in fruit yield as compared to control with treatment T1, T5 and T9 was about 16.2%, 9.8% and 7.8% respectively. Similarly the fruit yield with treatment T2 (20% *Chlorella* oil dispersion) as per embodiment of the present invention was about 374.5 Qtl/acre and treatment T6 (10% *chlorella* powder) was about 352.2 Qtl/acre. The percent increase in fruit yield as compared to control with treatment T2, T6 was about 15.7%, 8.8% respectively. Similarly significant results were observed for treatment T3, T4 prepared as per embodiment of the present invention on comparing it with treatments T7, T8 and T9 respectively.

Field Study 2: To study effect of 30% *Lithothamnium calcereum* oil dispersion on yield and yield attributing parameters on Grapes.

The field trials were carried out to observe the effect of *Lithothamnium calcereum* 30% oil dispersion on yield and quality parameters in grape field at Nasik, Maharashtra. The trial was laid out during rabi season in Randomized Block Design (RBD) with four treatments including untreated control, replicated thrice. For each treatment, six grape vine bush was maintained. The test samples with prescribed dose were applied as foliar thrice starting from flowering and ending with fruit setting. The Grapes in the field was raised following good agricultural practice.

Details of Experiment:
  a) Trial Location: Nasik (Maharashtra)
  b) Crop: Grape (var: Thomson seedless)
  c) Experiment season: October 2018 to March 2019
  d) Trial Design: Randomized Block Design
  e) Replications: Three
  f) Treatment: Four
  g) Number of plant/treatment: Six grape vine bushes
  i) Date of Application: 1st—19 Oct. 2018, 2nd—30 Oct. 2018; 3rd—15 Nov. 2018
  j) Method of application: Foliar spray
  k) Date of Harvesting: 29 Mar. 2019

The observations were recorded and mean data is presented in table 2 to enumerate the impact of different treatments.

TABLE 2

Efficacy data of Lithomanium calcereum oil dispersion on Grapes

| | Treatment details | Amount of calcium (in gm or ml/L water) | Product dose (in gm or ml/L water) | Fruit weight (g) | Total Solid Sugar (%) | Berry firmness (gF × mm−1) | Soluble sugar content (%) | Bunch weight (g) | Fruit yield (qtl/acre) | % fruit yield increase |
|---|---|---|---|---|---|---|---|---|---|---|
| T1 | Lithothamnium calcereum 30% | 0.37 | 3.9 ml | 6.33 | 19 | 245 | 14.7 | 890.2 | 89.34 | 13.3 |

TABLE 2-continued

Efficacy data of Lithomanium calcereum oil dispersion on Grapes

| Treatment details | Amount of calcium (in gm or ml/L water) | Product dose (in gm or ml/L water) | Fruit weight (g) | Total Solid Sugar (%) | Berry firmness (gF × mm−1) | Soluble sugar content (%) | Bunch weight (g) | Fruit yield (qtl/acre) | % fruit yield increase |
|---|---|---|---|---|---|---|---|---|---|
| | Oil Dispersion as per embodiment of present invention (9.6% Calcium) | | | | | | | | |
| T2 | Commercially available Yara cal trac product (19% calcium) | 0.38 | 2 g | 5.91 | 18 | 231 | 13.4 | 803.4 | 84.14 | 6.7 |
| T3 | Lithothamnium calcerum powder 30% | 0.37 | 3.9 g | 5.92 | 18 | 234 | 13.8 | 797.8 | 81.91 | 3.9 |
| T4 | Control | — | | 5.82 | 17 | 225 | 12.3 | 765.2 | 78.87 | 0.0 |

It was observed from Table 2, that treatment T1 with 30% *Lithothamnium calcereum* based oil dispersion as per the embodiment of present invention showed 13.3% increase in the total fruit yield and treatment T2 with commercially available calcium based product (Yara Caltrac) containing 19% calcium showed a 6.7% increase in fruit yield as compared to control. Also, it is observed that treatment T3 with 30% *Lithothamnium calcereum* powder as per the embodiment of present invention showed 3.9% increase in the fruit yield as compared to control. It was noted that treatment T1 had about 6.2% yield increase as compared to treatment T2 and 10% yield increase as compared to treatment T3 inspite of similar concentration of active applied for all the three treatments.

The composition of treatment T1 also showed a significant increase in the fruit weight, total solid sugar, soluble sugar content, berry firmness as compared to the commerically available composition. The results in the yield enhancement and fruit characteristics are particulary surprising when no chemical fertilizers or nutrients had been applied in the regions where the trials were carried, for over a year preceeding the trials.

Field Study 3: To study effect of algal oil dispersion against collar rot (causative agent: *Aspergillus niger*) on Groundnut crop.

The field trials were carried out to observe the effect of *Enteromorpha prolifera* on collar rot disease in Groundnut at Himatnagar, Gujarat. The trial was laid out during kharif season in Randomized Block Design (RBD) with four treatments including untreated control, replicated four times. For each treatment, plot size of 50 sq·m (10 m×5 m) was maintained. The treatments were applied with prescribed dose as seed treatment at the time of sowing. The Groundnut crop in trial field was raised following good agricultural practice.

Details of Experiment
  a) Trial Location: Himatnagar, Gujarat
  b) Crop: Groundnut (var: G 20)
  c) Experiment season: Kharif 2019
  d) Trial Design: Randomized Block Design
  e) Replications: Four
  f) Treatment: Four
  g) Plot size: 10 m×5 m=50 sq·m
  h) Date of sowing: 29 Jun. 2019
  i) Date of Application: 29 Jun. 2019
  j) Method of application: Seed treatment
  k) Date of Harvesting: 3 Oct. 2019

The observation on control of collar rot disease were recorded at 30, 45 and 60 days after sowing of the seed from 3 sq·m area demarcated randomly in each plot immediately after sowing of groundnut seed. The dead plants due to collar rot were counted at 30, 45 and 60 days and the mean of the same is presented in Table 3.

TABLE 3

Efficacy of Enteromorpha prolifera oil dispersion on Groundnut

| | Treatment details | Product dose (in gm or ml/kg seed) | % Seed germination | % Disease incidence of Collar rot | Pod yield (qtl/Acre) | % yield increase |
|---|---|---|---|---|---|---|
| T1 | Enteromorpha Prolifera Oil dispersion (20%) as per embodiment of the present invention | 5 ml | 92.3 | 2.7 | 14.9 | 30.7 |
| T2 | 20% Enteromorpha Prolifera powder | 5 g | 90.7 | 11.3 | 12.1 | 6.1 |
| T3 | Mancozeb 75% WP | 2 g | 91.3 | 4.7 | 13.3 | 16.7 |
| T4 | Control | — | 89.7 | 18.0 | 11.4 | — |

From Table 3, it can be observed that treatment T1 with 20% *Enteromorpha prolifera* oil dispersion as per the embodiment of present invention showed a surprising disease control with low disease incidence of only 2.7% of collar rot as compared to treatment T2 with 20% *Enteromorpha* powder with disease incidence of 11.3%. Also 92.3% seed germination was observed with treatment T1 and 90.7% seed germination was observed with T2. The commercially available sample i.e treatment T3 (75% Mancozeb WP) also demonstrated disease incidence of 4.7% and seed germination of 91.3%.

Field Study 4: To study effect of *Spirulina* oil dispersion at different particle size on Soyabean.

The pot trials experiment was carried out to study the effect of *Spirulina* oil dispersion at different particle sizes on protein synthesis in soybean over a period of time. The earthen pots with two kilogram sandy loam soil were used to maintain 4 replications of each treatment. Two soybean seeds were planted in each pot and maintained sufficient soil moisture for their proper growth.

The treatment compositions as described below in table 4 with different particle size were selected for the experiment. The experimental pots were kept at 28±2° C. temperature and sufficient moisture was maintained during entire experiment. The treatment samples with prescribed dose were applied as foliar application at the time of flowering. Soybean leaf from top 3 trifoliate was picked up for assessment for total protein content at 7, 14, 21, 28 and 35 days after treatment and the data is as presented in table 4 and graphs 1.

From the data represented in FIG. 1 and Table 4, it can be observed that treatment T1 (30% *Spirulina* oil dispersion having particle size in the range of 0.1 to 25 microns) and treatment T2 (30% *Spirulina* oil dispersion having particle size in the range of 0.1 to 50 microns) prepared according to an embodiment of the present invention demonstrates significant uptake of protein than that of treatments T3 (30% *Spirulina* oil dispersion having particle size in the range of 60 to 100 microns) and T4 (30% *Spirulina* oil dispersion having particle size in the range of 0.1 to 100 microns). For instance, protein content in the leaves after 7 days of application with treatment T1 was about 3.63 g/100 g fresh weight and treatment T2 was about 3.54 g/100 g fresh weight whereas with treatment T3 it was about 3.46 g/100 g fresh weight and with treatment T4 it was about 3.39 g/100 g fresh weight. Similarly high protein content was observed even after 21 days, 35 days of application of the treatments T1, T2 as compared to treatments T3 and T4.

This shows that oil dispersion composition of 30% *Spirulina* having particle size in the range of 0.1 to 50 microns makes the nutrients available for immediate and continuous uptake by plants.

It can be noted that, T1, T2, T3 and T4 in the form of oil dispersion with same concentration of actives and also applied at same dosages but T1 and T2 with specific particle size of 0.1-50 microns prepared according to an embodiment of the present invention demonstrated higher protein content as compared to treatments T3 and T4 with different particle size. Thus, it was surprisingly noted that even amongst oil dispersion formulations, superior efficacy was observed with oil dispersion formulation having specific particle size of 0.1-50 microns.

TABLE 4

Efficacy of Spirulina oil dispersion at different particle sizes on protein uptake in Soyabean leaves.

| | Treatment details | Dose of Product in gm or ml/L water | Protein content in leaves (g/100 g F.W) | | | | |
|---|---|---|---|---|---|---|---|
| | | | 7 DAA | 14 DAA | 21 DAA | 28 DAA | 35 DAA |
| T1 | 30% Spirulina oil dispersion as per embodiment of the present invention (particle size of the composition 0.1-25 microns) | 2 ml | 3.63 | 3.84 | 4.27 | 4.19 | 4.17 |
| T2 | 30% Spirulina oil dispersion as per embodiment of the present invention (particle size of the composition 0.1-50 microns) | 2 ml | 3.54 | 3.7 | 3.93 | 4.16 | 4.18 |
| T3 | 30% Spirulina oil dispersion (particle size of the composition 60-100 microns) | 2 ml | 3.46 | 3.54 | 3.73 | 4.02 | 4.07 |
| T4 | 30% Spirulina oil dispersion (particle size of the composition 0.1-100 microns) | 2 ml | 3.39 | 3.5 | 3.66 | 3.84 | 4.02 |

*F.W—Fresh weight

Thus, it has been observed that the compositions of the present invention, demonstrate enhanced, efficacious and superior behaviour in the fields. In fact, various advantageous properties associated with the compositions according to the invention, include but are not limited to improved stability, improved toxicological and/or ecotoxicological behaviour, improved crop characteristics including crop yields, crop qualities such as improved nutrient content, more developed root system, increase in crop height, bigger leaf blade, less dead basal leaves, stronger tillers, greener leaf color, less fertilizers needed, tillering increase, increased shoot growth, improved plant or crop vigor, earlier flowering, more productive tillers, less plant verse (lodging), improved chlorophyll content of the leaves, photosynthetic activity, early seed germination, early grain maturity, improved quality of the produce, improved fortification of the crop, conditioning the soil, disease resistance and other advantages familiar to a person skilled in the art.

Through the composition of the present invention, the number of applications or the amount of nutrients, fertilizers or pesticides are minimized. The composition is highly safe to the user and to the environment.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred.

I claim:

1. An oil dispersion composition comprising at least one algae or their derivatives present in the range of 0.1% to 65% by weight of the total composition;
   at least one water immiscible solvent present in the range of 0.1% to 80% by weight of the total composition;
   at least one surfactant in the range of 0.1% to 60% by weight of the total composition;
   and at least one agrochemical excipient;
   wherein the composition comprises particles in a size range of 0.1 to 50 microns.

2. The oil dispersion composition of claim 1, wherein the ratio of total weight of algae to the total weight of the surfactant is in the range of 650:1 to 1:600.

3. The oil dispersion composition of claim 1, wherein the ratio of total weight of algae to the total weight of the surfactant is in the range of 650:1 to 1:500.

4. The oil dispersion composition as claimed in claim 1, wherein the algae is selected from green algae, red algae, golden algae, brown algae, golden-brown algae, blue algae, blue-green algae or their derivatives, species or mixtures thereof.

5. The oil dispersion composition as claimed in claim 1, wherein the algae comprises one or more of *Cyanobacteria, Phaeophyceae, Ochrophytes, Glaucophytes, Rhodoplasts, Rhodophytes, Chloroplasts, Ochrophytes, Chrysophyta, Raphidiophyceae, Eumastigophyceae, Xanthophyceae, Synurophytes, Silicoflagellata, Sarcinochrysophyceae, Heterokonts, Crytophytes, Haptophytes, Euglenophytes, Chlorophytes, Charophytes, Embrophyta* or *Chlorarachniophytes* or their derivatives, species or mixtures thereof.

6. The oil dispersion composition as claimed in claim 1, wherein the algae comprises at least one of *Spirulina* Sp., *Arthrospira* Sp., *Chlorella* Sp., *Anabaena* Sp., *Sargassum* Sp., *Scenedmus* Sp., *Aphanizomenon* Sp., *Dunaliella* Sp., *Phymatolithion* Sp., *Lithothamnium* Sp., *Ascophyllum* Sp., *Enteromorpha* Sp., *Tetraselmis* Sp., *Prymnesium* Sp., *Chlamydomonas* Sp., *Euglena* Sp., *Caulerpa* Sp., *Padina* Sp., *Urophora* Sp., *Chondria* Sp., *Caulerpa* Sp., *Lyngby* Sp., *Prasiola* Sp., *Gymnopilus* Sp., *Melanothamnus* Sp., *Turbeneria* Sp., *Mastigocladopsis* Sp., *Hydroclathrus* Sp., *Padina* Sp., *Cystoseira* Sp., *Laminaria* Sp., *Fucus* Sp., *Ulva* Sp. or their derivatives, species or mixtures thereof.

7. The oil dispersion composition as claimed in claim 1, wherein the composition has a viscosity of 10 cps to 3000 cps.

8. The oil dispersion composition as claimed in claim 1, wherein the composition has a pourability of less than 5% residue.

9. The oil dispersion composition as claimed in claim 1, wherein the wet sieve retention value on a 75 micron sieve is less than 0.5%, preferably less than 0.2%.

10. The oil dispersion composition as claimed in claim 1, wherein the composition shows dispersion stability for at least 30 minutes.

11. The oil dispersion composition as claimed in claim 1, wherein the composition has a suspensibility of at least 30%.

12. The oil dispersion composition as claimed in claim 1, wherein the composition further comprises additional active ingredients selected from one or more of pesticidal actives, microbials, fertilizers, macronutrients, micronutrients, biostimulants or mixtures thereof present in the range of 0.1% to 90% by weight of the total composition.

13. The oil dispersion composition as claimed in claim 1, wherein the surfactant comprises one or more of emulsifiers, wetting agents or dispersing agents present in the range of 0.1% to 50% by weight of the total composition.

14. The oil dispersion composition as claimed in claim 1, further includes at least one structuring agent which comprises one or more of thickeners, viscosity modifiers, tackifiers, suspension aid, rheology modifiers and anti-settling agents.

15. The oil dispersion composition of claim 1, wherein the agrochemical excipient is selected from one or more of pigments, colourants, pH adjusters, antifoaming agents, chelating or complexing or sesquitering agents, humectants, preservatives, antifreezing agent, sticking agents and spreading agents.

16. A process of preparation of the composition as claimed in claim 1 comprises: mixing of at least one water immiscible solvent, one or more surfactant to obtain a solvent-excipient mixture, adding at least one algae and other optional agrochemical excipients to the solvent-excipient mixture to obtain a homogenized solution and milling homogenized solution to obtain a dispersed medium of particle size in the range of 0.1-50 microns.

17. A method of improving the crop health, improving the crop nutrition, protecting the crop, enhancing the crop yield, strengthening the plant, the method comprising treating at least one of seeds, seedling, crops, a plant, plant propagation material, locus, parts thereof or to the surrounding soil with effective amount of the agricultural composition as claimed in claim 1.

* * * * *